United States Patent
Bushen et al.

(10) Patent No.: US 9,317,458 B2
(45) Date of Patent: Apr. 19, 2016

(54) SYSTEM FOR CONVERTING A SIGNAL

(75) Inventors: Kirk I. Bushen, Tewksbury, MA (US); Gilbert Arthur Joseph Soulodre, Ottawa (CA)

(73) Assignee: Harman International Industries, Incorporated, Stamford, CT (US)

( * ) Notice: Subject to any disclaimer, the term of this patent is extended or adjusted under 35 U.S.C. 154(b) by 961 days.

(21) Appl. No.: 13/447,477

(22) Filed: Apr. 16, 2012

(65) Prior Publication Data

US 2013/0272528 A1    Oct. 17, 2013

(51) Int. Cl.
*H04R 5/00*     (2006.01)
*G06F 13/16*   (2006.01)

(52) U.S. Cl.
CPC .................. *G06F 13/1663* (2013.01)

(58) Field of Classification Search
CPC ........ H04S 3/00; H04S 3/002; H04S 2420/01
USPC ............. 381/18, 307, 17, 19, 22, 71.14, 94.2, 381/63; 708/403
See application file for complete search history.

(56) References Cited

U.S. PATENT DOCUMENTS

| | | | |
|---|---|---|---|
| 5,222,189 A * | 6/1993 | Fielder | 704/229 |
| 2004/0105506 A1 | 6/2004 | Baek et al. | |
| 2004/0122314 A1* | 6/2004 | Fattah et al. | 600/437 |
| 2005/0132870 A1* | 6/2005 | Sakurai et al. | 84/612 |
| 2006/0269086 A1* | 11/2006 | Page et al. | 381/119 |
| 2008/0080619 A1* | 4/2008 | Heng et al. | 375/240.18 |
| 2008/0263285 A1 | 10/2008 | Sharma et al. | |
| 2009/0274308 A1* | 11/2009 | Oh et al. | 381/2 |
| 2013/0030819 A1* | 1/2013 | Purnhagen et al. | 704/500 |
| 2013/0272528 A1* | 10/2013 | Bushen et al. | 381/18 |

FOREIGN PATENT DOCUMENTS

WO    9502288 A1    1/1995

OTHER PUBLICATIONS

EP Search Report dated Jul. 7, 2014 for EP13162959.4-1954 / 2653974.

* cited by examiner

*Primary Examiner* — Alexander Jamal
(74) *Attorney, Agent, or Firm* — Brooks Kushman P.C.

(57) ABSTRACT

A device for processing a signal includes a processing module used to process data in a domain. The device includes domain conversion hardware and memory, both separate from the processing module. The memory receives and sends data represented in a first domain to the domain conversion hardware. The domain conversion hardware converts the first domain data into the second domain data that may be used or processed by the processing module. The second domain data is then accessed and used by the processing module for processing.

29 Claims, 11 Drawing Sheets

SYSTEM FOR CONVERTING A SIGNAL

BACKGROUND OF THE INVENTION

1. Technical Field

The disclosure relates to a system and method (generally referred to as a "system") for processing a signal.

2. Related Art

With continuing technological advancements and the development of increasingly powerful devices, signals carrying information and data can be sent faster and to more recipients than ever before. As the computing power of these devices increases, so too does the demand for fast and efficient processing and analysis of received signals.

SUMMARY

A device for processing a signal includes a processing module used to process data in a domain, such as frequency domain data. The device includes domain conversion hardware and memory, both separate from the processing module. The memory receives and sends data represented in a first domain, such as the time domain, to the domain conversion hardware. The domain conversion hardware converts the first domain data into second domain data, such as data that may be processed by the processing module. The second domain data is then accessed and used by the processing module for processing. An inverse domain conversion hardware may be included with the device. The inverse domain conversion hardware may receive the processed second domain data, and may convert the processed second domain data back to the first domain to be output by the device.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Information and data ("data") may be stored in and carried by signals or other transmissions ("signals") to or from one or more devices. Such signals may be sent or transmitted to, or received by, a device continuously, at periodic intervals, when an event triggers a transmission, or at various other times. A transmitting or receiving device may desire or need to convert a signal or data about a signal from one domain to another domain prior to or after analyzing or processing the signal. For example, a device may receive a time domain audio signal, upon which the device may wish to perform frequency domain processing, such as noise reduction, de-reverberation processing or algorithms, QuantumLogic™, or other surround sound algorithms. Frequency domain processing may be increasing in prevalence in some processors. As such, the device may need to convert the received time domain audio signal into the frequency domain in order to perform the desired frequency domain processing. As another example, a device may access or receive frequency domain data about a signal, upon which the device may desire to convert the frequency domain data into the time domain in order to perform time domain processing. As another example, a device may receive and process frequency domain data about a signal, after which the device may need to convert the frequency domain data into a time domain signal, such as where it is desirable that the device transmit the signal in a certain format.

Figure 1:
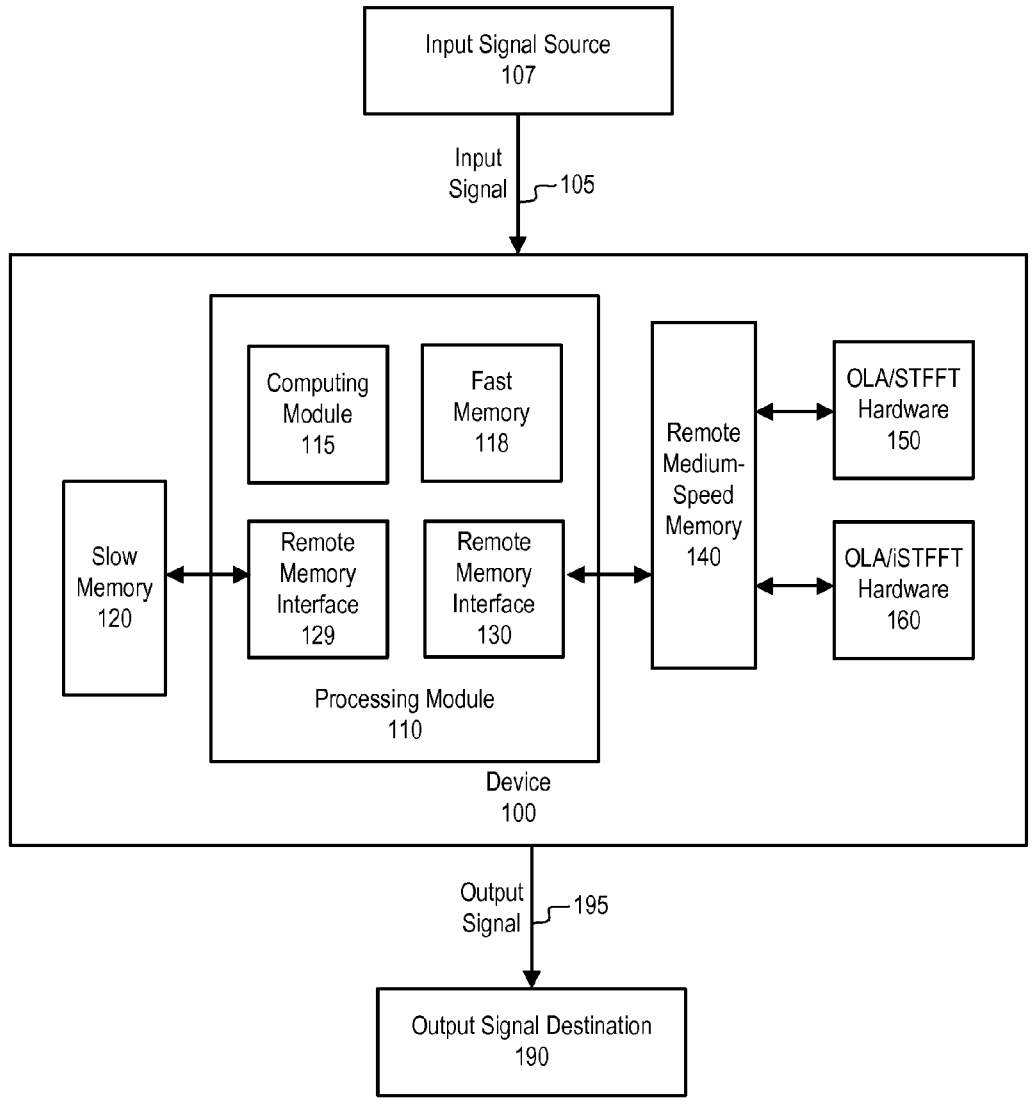
FIG. 1 is a block diagram of an example device for converting a signal.

FIG. 1 illustrates an environment where one or more signals may be received by, processed using, or transmitted from a device 100. The device 100 may include one or more hardware abstraction layers, above a transform layer, that may be used for transforming a signal or data about a signal back and forth between the time and frequency domains in real time or near real time.

The device 100 may receive one or more input signals 105, such as from one or more input signal sources 107. The input signal 105 may be or represent one or more signal types or formats, and/or may exist or be represented in one or more domains. For example, the input signal 105 may be an audio signal, a video signal, an information-carrying signal, or various other signals or combinations of signals. The received input signal 105 may, for example, be or be represented in a time domain or a frequency domain.

The input signal 105 may be generated, sent and/or transmitted from one or more input signal sources 107 to the device 100. The input signal source 107 may, for example, be a microphone or soundboard transmitting an audio signal, a media player such as a DVD player transmitting an audio, video, or audio/video signal, a processor transmitting various types of information or media signals, or any other source or device that may generate, send, or transmit a signal to the device 100.

The device 100 may be used to perform one or multiple signal conversions, such as multiple Fast Fourier Transforms ("FFTs") and inverse FFTs, on continuously received signals in real time or near real-time. The device 100 may perform these signal conversions without utilizing fast internal memory or hardware accelerator blocks on a processing module 110. Instead, signal conversions may be performed through the use of remote medium-speed memory 140 and domain conversion hardware, such as an overlap-and-add short time Fast Fourier Transform ("OLA/STFFT") hardware 150 or an overlap-and-add inverse short time Fast Fourier Transform ("OLA/iSTFFT") hardware 160, as discussed later.

The device 100 may also or alternatively extract data from the signal, and/or may process, analyze, apply algorithms to, or otherwise manipulate the received signal and/or data from the signal, such as through or with a processing module 110 as discussed later. For example, the device 100 may apply one or more surround sound, noise reduction, or de-reverberation algorithms to the received data about a signal. Various other processes may be performed. After processing, the device may also or alternatively perform one or more signal or data conversions on the processed or manipulated signals or data, such as using the remote medium-speed memory 140, OLA/STFFT hardware 150, and OLA/iSTFFT hardware 160.

After converting and/or processing the signal or data from the signal, the device 100 may output an output signal 195. The output signal 195 may be or represent one or more signal types or formats. For example, the output signal 195 may be an audio signal, a video signal, an information-carrying signal, or various other signals. The output signal 195 may exist or be represented in one or more domains. For example, the output signal 195 may, for example, be or be represented in a time domain or a frequency domain. The output signal 195 may have similar or different properties from the input signal 105. For example, the input signal 105 and the output signal 195 may both be represented in the same domain (such as where both are time domain signals or both are frequency domain signals), or the input signal 105 may be represented in a first domain while the output signal 195 may be represented in a second, different domain. Other variations are possible. The output signal 195 may be sent from the device 100 to one or more output signal destinations 190. Output signal destinations 190 may, for example, be speakers configured to receive surround sound audio output signals 195. Other output signal destinations 190 may, for example, include one or more monitors, processors, mixing boards, amplifiers, or any device or component configured to receive a signal.

The device 100 may include a processing module 110. The processing module 110 may be or represent one or more digital signal processor ("DSP"), analog processor or chip, processing chip, other physical processor, field programmable gate array ("FPGA"), and/or other integrated circuit. The processing module 110 may include one or more of a computing module 115, memory such as fast memory 118, and one or more remote memory interfaces 129 and 130. In other examples, the components illustrated in the processing module 110 may be external or included in one or more separate integrated circuits or chips that form the processing module 110. In other systems, the processing module 110 may also or alternatively directly include slow memory 120 and/or medium-speed memory 140 within the processing module 110. The processing module 110, or one or more components within the processing module 110, may communicate internally or with other components within the processing module 110 in various ways, such as by or through wired or wireless communication links, by or using a communication bus interconnecting one or more components of the processing module 110, or through various other communication links or lines. Additional or fewer components may be possible.

The computing module 115 of the processing module 110 may, for example, represent hardware or hardware accelerator blocks that may be used for performing one or more processes, computations, calculations, algorithms, or other manipulations or for running software, code, or other logic. For example, the computing module 115 may perform core logic functions, such as surround sound, noise reduction, or de-reverberation algorithms, on frequency domain audio signals or data. As another example, the computing module 115 may be used to combine, mix, synthesize, filter, up-sample, down-sample, de-noise, or otherwise process a signal or data received by the device 100. Various other examples are possible.

The processing module 110 may include or access various types of memory. For example, the processing module 110 may include internal fast memory 118. Internal fast memory 118 may be or include dynamic random-access memory ("DRAM"), content addressable memory, cache memory, internal random-access memory ("RAM"), and/or various other types of internal fast memory. Fast memory 118, such as internal RAM, may have an asynchronous interface, which may allow the fast memory 118 to respond as quickly as possible to changes in control inputs.

The processing module 110 may additionally or alternatively include one or more remote memory interfaces 129 and 130. The remote memory interface 129 may be used to connect or communicate with a remote slow memory, such as slow memory 120. The remote memory interface 129 may, for example, be or include an asynchronous random-access memory ("RAM") bus that may be used to communicate with the slow memory 120. Slow memory 120 may, for example, be or include synchronous dynamic random-access memory ("SDRAM") memory, double data rate synchronous dynamic random access memory ("DDR SDRAM," "DDR," or "DDR memory"), or various other types of slow memory. Slow memory 120 may, for example, be accessed using a direct-memory access ("DMA") controller or other device. Slow memory 120 may be very slow compared to the fast memory 118. Slow memory 120 may be used for or during processing or computations that are not time-sensitive or dependent. In some systems, slow memory 120 may be so slow that it may not be practical or possible to use the slow memory 120 with real-time or near real-time calculations, such as real-time or near real-time FFTs or iFFTs. The remote memory interface 129 may be or provide an interface between the processing module 110 and the slow memory 120, allowing the processing module 110 to access and use data, information, code, or logic stored within the slow memory 120. While slow memory 120 is shown as being included within the device 100 but separate from the processing module 110, in some systems, the slow memory 120 may be completely separate from the device 100, or may be included within the processing module 110. Various other configurations are possible.

The remote memory interface 130 may be used to connect or communicate with remote medium-speed memory 140. For example, the remote memory interface 130 may be similar to or resemble the remote memory interface 129 and may include an asynchronous random-access memory ("RAM") bus that may be used to communicate with the remote medium-speed memory 140. Remote medium-speed memory 140 may be or include, for example, static random-access memory ("SRAM"), or other memory which may be separate from and accessible to the processing module 110. Remote medium-speed memory 140 such as SRAM may be slower than fast memory 118 like internal RAM, but may be considerably faster than the slow memory 120 like DDR or SDRAM memory. The remote memory interface 130 may be or provide an interface between the processing module 110 and the remote medium-speed memory 140, allowing the processing module 110 to access and use data, information, code, or logic stored within the remote medium-speed memory 140. While remote medium-speed memory 140 is shown as being included within the device 100 but separate from the processing module 110, in some systems, the medium-speed memory 140 may be completely separate from the device 100, or may be included within the processing module 110. Various other configurations are possible.

Part or all of the memory on or accessible to the processing module 110, such as the fast memory 118, the slow memory 120, and the remote medium-speed memory 140, may be used to store one or more of data, information, code, or logic. Various hardware components or other computing modules, such as the computing module 115, may access code or logic stored in memory on or accessible to the processing module 110 which may include instructions for performing one or more processes, computations, calculations, or algorithms. The hardware and computing modules may also or alternatively use signals or data stored in memory as inputs upon which to perform one or more processes, computations, calculations, or algorithms. The hardware and computing modules may store data or other information in memory on or accessible to the processing module 110 before, during, or after processing, calculating, or performing other manipulations various signals or data. For example, the computing module 115 may store data related to partial calculations or data related to intermediate steps of a computation or process in memory, which the computing module 115 may later retrieve and use in subsequent processing or algorithmic steps.

When performing complex, fast, real-time, near real-time, highly desirable, or core processes, algorithms, computations, or calculations, such as various surround sound, noise reduction, or de-reverberation algorithms, it may be useful and advantageous to utilize the fast memory 118 on the processing module 110 to store one or more of the data, information, code, and logic necessary to perform processes, as well as the computing module 115 to perform the desired processes. The internal fast memory 118 may represent the most efficient cost-effective manner of performing these processes. The fast memory 118 may store frequency domain data or signals upon which the processing module 110 may perform surround sound, noise reduction, or de-reverberation algorithms, as well as the code or logic storing the instructions for performing the surround sound, noise reduction, or de-reverberation algorithms. The computing module 115 may additionally or alternatively use the fast memory 118 to store intermediate data or information resulting from computations or calculations associated with surround sound, noise reduction, or de-reverberation processes. Various other types of processes and examples are possible.

However, some processing modules 110 or computing modules 115 may not be able to efficiently perform signal conversions in addition to other core logic or processes that the chip 110 may be running. For example, in some systems, while the processing module 110 may include an FFT hardware block or hardware accelerator, these FFT hardware blocks are generally unable or unsuitable for performing multiple FFTs or iFFTs on continuously received signals in real time or near real time. As such, these FFT hardware blocks may not be useful with the computing module 115 in continuously converting and processing signals received in real-time. Even if the FFT hardware blocks were technically capable of performing multiple FFTs and iFFTs on data received, the frequency domain processing often requires large amounts of fast memory 118 and/or medium speed memory 140 for data storage. However, the internal fast memory 118 may be expensive and represent valuable memory useful for processing performed by the processing module 110. Additionally, an amount of internal fast memory 118 available for processing may be very limited. Using any amount of internal fast memory 118 for the signal conversion may slow all other core processes, making the processing module 110 inadequate for performing real-time signal conversion and processing.

Accordingly, while the fast memory 118, computing module 115, and other components of the processing module 110 may be used to perform various core logic functions, the device 100 may utilize the remote medium-speed memory 140, as well as one or more OLA/STFFT hardware 150 and OLA/iSTFFT hardware 160 in communication with the remote medium-speed memory 140, for the performance of one or more signal conversions. In some systems, handshaking between these components may be implemented in various ways including on chip specific of general purpose registers.

The OLA/STFFT hardware 150 may be or include one or more of an application specific integrated circuits, field programmable gate arrays, analog circuits, a general processor, digital signal processor, servers, networks, digital circuits, combinations thereof, or other now known or later developed devices for receiving and converting a signal or data about a signal from a first domain to a second domain, such as by or through one or more domain transformations. As a specific example, the OLA/STFFT hardware 150 may be configured or operable to convert a signal or data from a time domain to a frequency domain, such as by or through the application of one or more FFT algorithms. The OLA/STFFT hardware 150 may implement a software program, such as code generated manually (i.e., programmed).

The OLA/iSTFFT hardware 160 may be or include one or more of an application specific integrated circuits, field programmable gate arrays, analog circuits, a general processor, digital signal processor, servers, networks, digital circuits, combinations thereof, or other now known or later developed devices for receiving and converting a signal or data about a signal from a second domain to a first domain, such as by or through one or more domain transformations. As a specific example, the OLA/iSTFFT hardware 160 may be configured or operable to convert a signal or data from a frequency domain to a time domain, such as by or through the application of one or more iFFT algorithms. The OLA/iSTFFT hardware 160 may implement a software program, such as code generated manually (i.e., programmed). While the OLA/STFFT hardware 150 and/or the OLA/iSTFFT hardware 160 may be described with reference to converting a signal or data to or from a frequency domain or a time domain using various Fourier transforms, either or both the OLA/STFFT hardware 150 and the OLA/iSTFFT hardware 160 may be configured or operable to use or apply one or more other transformation functions or algorithms to transform a signal or data to or from various domains, such as a time domain, frequency domain, a warped frequency domain, a wavelet domain, a filter bank domain, or various other domains. While the OLA/STFFT hardware 150 and the OLA/iSTFFT hardware 160 are shown in FIG. 1 as separate hardware components, in some systems, the OLA/STFFT hardware 150 and the OLA/iSTFFT hardware 160 may be the same, or part of the same, component, and may be separate from the processing module 110. Other variations or examples are possible.

The remote medium-speed memory 140 may be used to store data needed or required for performance of an FFT or an iFFT. The remote medium-speed memory 140 may be connected with or communicate with one or more OLA/STFFT hardware 150 and OLA/iSTFFT hardware 160, which may perform the FFT or iFFT remotely, separately, and distinctly from the processing module 110, as discussed below. Each of the OLA/STFFT hardware 150 and OLA/iSTFFT hardware 160 may be or represent a hardware abstraction layer in addition to hardware layers of the processing module 110. While one remote medium-speed memory 140 is shown, in some systems, each of the domain conversion hardware components may access and use separate remote medium-speed memories.

The use of the remote medium-speed memory 140 and one or more of the OLA/STFFT hardware 150 and OLA/iSTFFT hardware 160 for performing signal conversions, as discussed below, may free the valuable computing power of the computing module 115 and the fast memory 118 of the processing module 110 to perform the most complex and desirable processing functions without being slowed or compromised by storing or processing data, information, code, and logic necessary to perform the signal conversions. The use of these components for performing signal conversion without using the resources of the processing module 110 may represent a reasonable tradeoff between price and memory access speeds, as the remote medium-speed memory 140 may be cheaper than the fast memory 118. The use of remote medium-speed memory 140 may allow the processing modules 110 to be made smaller and with less fast memory 118 than if the fast memory 118 were needed for performing signal conversions. While frequently described with respect to converting a time domain audio signal into a frequency domain data for processing, the signal converting components of the device 100 may be used in any device or system where a signal is received and is desired to be converted to a different domain prior to or after processing of the signal.

Figure 2:
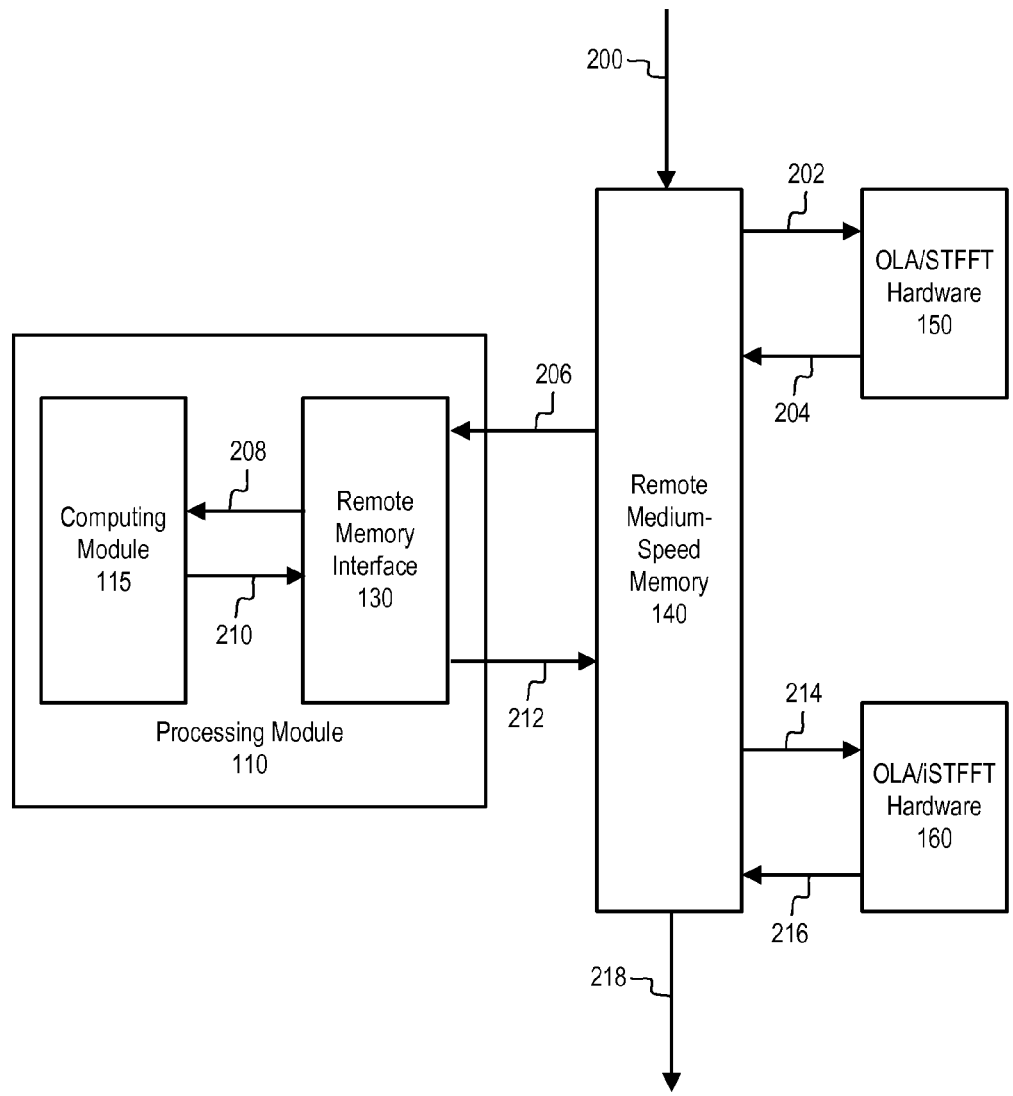
FIG. 2 is a block diagram of an example device for converting a signal.
Figure 3:
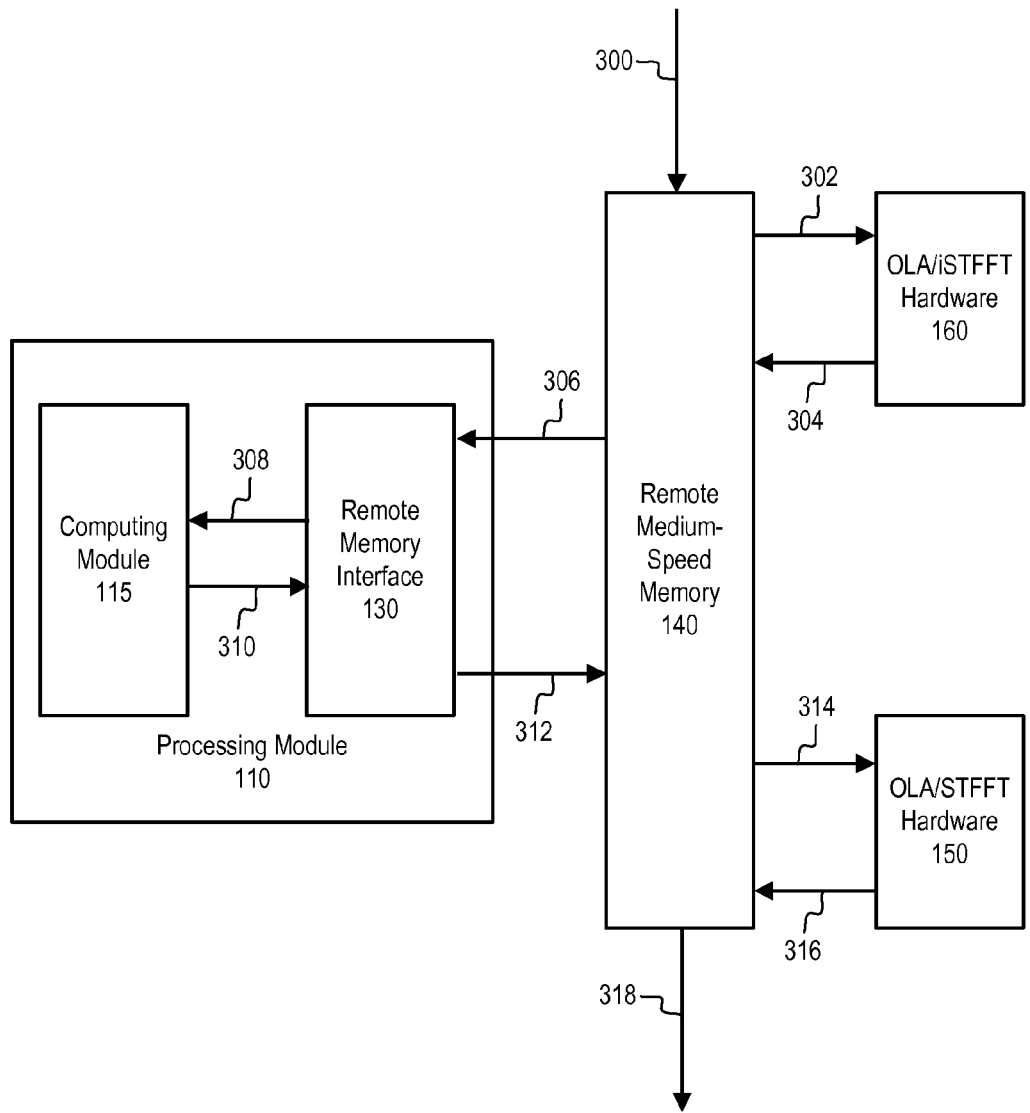
FIG. 3 is a block diagram of an example device for converting a signal.

FIGS. 2 and 3 show examples of how the processing module 110, the remote medium-speed memory 140, and domain conversion hardware such as the OLA/STFFT hardware 150 and/or the OLA/iSTFFT hardware 160, may communicate in order to may perform one or more signal conversions and processes for the device 100.

The configuration in FIG. 2 may be used where the computing module 115 of the processing module 110 may desire to receive a frequency domain signal or data for processing. A time domain input signal 200 may be received by the remote medium-speed memory 140. The time domain input signal 200 may be similar to or the same as the input signal 105. While the time domain input signal 200 is shown as being received directly by the remote medium-speed memory 140, in some other systems, the time domain input signal 200 may first be received by the processing module 110, a transceiver, an interface, or another component, after which the time domain input signal 200 may be sent to or received by the remote medium-speed memory 140.

The time domain input signal 200, data from or about the time domain input signal 200, or samples from the time domain input signal 200, may be stored in the remote medium-speed memory 140 as time domain input data 202. Storage of the time domain input data 202 in the remote medium-speed memory 140 may occur continuously as the input signal 200 is received, periodically, at intervals, when triggered, or at various other times.

The stored time domain input signal data 202 may be sent to, or accessed by the OLA/STFFT hardware 150. The OLA/STFFT hardware 150 may receive or access the time domain input signal data 202 continuously, periodically, when triggered, or at various intervals, such as when a buffer in the remote medium-speed memory 140 is full or nearly full of samples or data about the time domain input signal 200. In other systems, the time domain input signal 200 may be sent directly to the OLA/STFFT hardware 150 without storing any time domain input data 202 in the remote medium-speed memory 140.

Once the OLA/STFFT hardware 150 has received an amount of time domain input signal data 202, such as a predetermined number of input signal samples, the OLA/STFFT hardware 150 may perform a signal conversion on the time domain input signal data 202 received. In some systems, one or more registers may be incorporated and/or used for handshaking.

The OLA/STFFT hardware 150 may convert the signal or data from a time domain into a frequency domain in various ways, such as by applying a Fourier Transform to a time domain signal or data. The Fourier Transform may decompose a sequence of values into components of different frequencies, thereby converting the time domain signal into a frequency domain signal. A Fast Fourier Transform ("FFT") may be an efficient way of converting the time domain signal to a frequency domain signal, as the FFT applies a Fourier Transform to a discrete set of samples or representative values of the time domain signal, reducing computational steps with minimal accuracy sacrifices. Various FFT algorithms, such as a Cooley-Tukey FFT algorithm, Prime-factor FFT algorithms, Split-radix FFT algorithms, Bruun's FFT algorithm, Radar's FFT algorithm, Bluestein's FFT algorithm, or various other FFT algorithms, may be implemented or used by a device to convert a time domain signal into a frequency domain signal. The result of the signal conversion performed by the OLA/STFFT hardware 150 may be a frequency domain input signal or frequency domain data about the time domain input signal 200, which may be referred to as the OLA/STFFT output data 204. While the systems and methods may describe uses with various FFT and inverse FFT transforms, it should be appreciated that the OLA/STFFT hardware 150 and/or the OLA/iSTFFT hardware 160 may be configured and or used to perform other non-FFT transforms, such as wavelets, discrete cosine transforms, and various other transforms.

The processing module 110 may receive or access the frequency domain OLA/STFFT output data 204 as a frequency domain input signal or frequency domain input data, referred to as frequency domain input data 206. The frequency domain input data 206 may be, or may be the same as, the frequency domain OLA/STFFT output data 204. One or more of the frequency domain OLA/STFFT output data 204 or frequency domain input signal 206 may be represented in a domain or format that may be used by the processing module 110 of the device 100 for processing or other algorithms.

In some systems, the frequency domain OLA/STFFT output data 204 may first be sent to, or accessed by, the remote medium-speed memory 140, after which the processing module 110 may receive the frequency domain input data 206. In these systems, the remote medium-speed memory 140 may or may not store the frequency domain OLA/STFFT output data 204. In other systems, the frequency domain OLA/STFFT 204 may be sent directly to, or accessed directly by, the processing module 110.

The processing module 110 may receive or access the frequency domain input signal 206 through or using the remote memory interface 130 or with or through the use of a DMA controller. The processing module 110 may receive or access the frequency domain input signal 206 continuously, periodically, when triggered, or at various intervals, such as after each FFT is performed by the OLA/STFFT hardware 150. In some systems, the frequency domain input signal 206 may be stored and transferred to the processing module 110 over or using a memory bus where memory bandwidth utilization may be maximized, such as by arranging the data in a contiguous manner. Other variations are possible.

The remote memory interface 130 may send or transmit the received frequency domain input data 206 to the computing module 115 of the chip 110 as the processing input data 208. The processing input data 208 may be the same as, represent, or be similar to the frequency domain input data 206.

The processing input data 208 may be in a domain or format that may be used by or necessary for processing by the computing module 115. For example, the processing input data 208 may be frequency domain data where the computing module 115 desires or requires frequency domain signals or data in order to perform various processes, algorithms, or other tasks.

The computing module 115 may perform or apply one or more processes, algorithms, logic, code, software, or other analysis on the processing input data 208. For example, the computing module 115 may apply various surround sound algorithms on the processing input data 208. The computing module 115 may or may not use or access other memory, such as fast internal memory 118 or slow memory 120, before, during, or after the processing of the processing input data 208. For example, code or logic with instructions for the processing performed by the computing module 115 may be stored in the fast memory 118, and accessed by the computing module 115 before or during the operation of any processing or calculations performed by the computing module 115 on the processing input data 208.

A result of the processing performed by the computing module 115 may be frequency domain processing output data 210. The processed frequency domain output data 210 may then be sent to or accessed by the remote memory interface 130 of the processing module 110.

The remote medium-speed memory 140 may receive or access a frequency domain output signal 212 from the remote memory interface 130. The frequency domain output signal 212 may be the same as, represent, or be similar to the frequency domain processing output data 210.

While the processing input data 208 is shown as being sent directly to the computing module 115, in some systems, the frequency domain input signal 206 may be stored in memory on or accessible to the processing module 110, such as internal fast memory 118 or slow memory 120, prior to, during, or after being received or accessed by the computing module 115. Additionally or alternatively, while the processing output data 210 is shown as being sent directly to the remote memory interface 130, in some systems, the processing output data 210 may be stored in memory on or accessible to the processing module 110, such as internal fast memory 118 or slow memory 120, prior to, during, or after being sent to or accessed by the remote memory interface 130.

The remote medium-speed memory 140 may receive or otherwise access and/or store the frequency domain output signal or data about the frequency domain output signal, referred to as frequency domain output signal data 214. Storage of the frequency domain output signal data 214 in the remote medium-speed memory 140 may occur continuously, periodically, when triggered, at intervals, such as at every interval where the computing module 115 has completed processing the processing input data 208 and has outputted the processing output data 210, or at various other times.

The stored frequency domain output signal data 214 may be sent to, or accessed by the OLA/iSTFFT hardware 160, which may be referred to as an inverse domain conversion hardware. The OLA/iSTFFT hardware 160 may receive or access the frequency domain output signal data 214 continuously, periodically, when triggered, or at various intervals, such as when a buffer in the remote medium-speed memory 140 is full or nearly full of samples or data about the frequency domain output signal 212 or at each time interval that the OLA/STFFT hardware 150 receives time domain input signal data 202 from the remote medium-speed memory 140. In other systems, the frequency domain output signal 212 may be sent directly to the OLA/iSTFFT hardware 160 without storing any frequency domain output signal data 214 in the remote medium-speed memory 140.

The OLA/iSTFFT hardware 160 may perform a signal conversion on the frequency domain output signal data 214 received. The OLA/iSTFFT hardware 160 may convert the signal or data from a frequency domain into a time domain in various ways as well. For example, the OLA/iSTFFT hardware 160 may apply an inverse Fourier Transform to the frequency domain signal or data, such as an Inverse Fast Fourier Transform ("iFFT" or "inverse FFT"), or various other non-FFT transformations. Inverse FFT's may operate to recover a time domain signal by constructing the time domain signal from the frequency domain signal. The result of the signal conversion performed by the OLA/iSTFFT hardware 160 may be a time domain output signal or time domain data about the frequency domain output signal 212, which may be referred to as the OLA/iSTFFT output data 216.

The processing module 110 may receive or access the time domain OLA/iSTFFT output data 216 as a time domain output signal or time domain output data, referred to as time domain output signal 218. The time domain output signal 218 may be, or may be the same as, the time domain OLA/iSTFFT output data 216. One or more of the time domain OLA/iSTFFT output data 216 or time domain output signal 218 may be represented in a domain or format that may be useful to output signal destinations 190. The time domain output signal 218 may be similar to or the same as the output signal 185.

In some systems, the time domain OLA/iSTFFT output data 216 may be sent to, or accessible to, the remote medium-speed memory 140, after which the output signal destinations 190 may receive the time domain output signal 218. In these systems, the remote medium-speed memory 140 may or may not store the time domain OLA/iSTFFT output data 216. In other systems, the time domain OLA/iSTFFT output data 216 may be sent directly to, or accessed directly by, the output signal destinations 190. In some systems, the output data 216 may be sent to the output signal destinations 190 through the device 100, through an interface on the remote medium-speed memory 140, or in various other ways.

While FIG. 2 shows a time domain input signal 200 and a time domain output signal 218, it should be appreciated that the system could be modified depending on the type of input signal 200 received and/or the type of output signal desired. For example, where the input signal 200 is a frequency domain signal, the system may eliminate the use of the OLA/STFFT hardware 150. In this example, the input signal 200 may be sent as a frequency domain input signal 206 to the processing module 110 for processing. As another example, where a frequency domain output signal 212 is desired by one or more output signal destinations 190, the device 100 may eliminate the use of the OLA/iSTFFT hardware 160. In this example, the output signal 218 may be or reflect the frequency domain output signal 210 from the computing module 115. Various other examples are possible.

The system in FIG. 2 may be utilized to provide frequency domain signals to a computing module 115. FIG. 3 illustrates an opposite configuration, where the computing module 115 of the processing module 110 may desire to receive a time domain signal or data for processing.

A frequency domain input signal 300 may be received by the remote medium-speed memory 140. The frequency domain input signal 300 may be similar to or the same as the input signal 105. While the frequency domain input signal 300 is shown as being received directly by the remote medium-speed memory 140, in some other systems, the frequency domain input signal 300 may first be received by the processing module 110, a transceiver, an interface, or another component, after which the frequency domain input signal 300 may be sent to or received by the remote medium-speed memory 140.

The frequency domain input signal 300, data from or about the frequency domain input signal 300, or samples from the frequency domain input signal 300, may be stored in the remote medium-speed memory 140 as frequency domain input data 302. Storage of the frequency domain input data 302 in the remote medium-speed memory 140 may occur continuously as the input signal 300 is received, periodically, at intervals, when triggered, or at various other times.

The stored frequency domain input data 302 may be sent to, or accessed by the OLA/iSTFFT hardware 160. The OLA/iSTFFT hardware 160 may receive or access the frequency domain input data 302 continuously, periodically, when triggered, or at various intervals, such as when a buffer in the remote medium-speed memory 140 is full or nearly full of data about the frequency domain input signal 300. In other systems, the frequency domain input signal 300 may be sent directly to the OLA/iSTFFT hardware 160 without storing any frequency domain input data 302 in the remote medium-speed memory 140.

Once the OLA/iSTFFT hardware 160 has received an amount of frequency domain input data 302, the OLA/iSTFFT hardware 160 may perform a signal conversion on the frequency domain input data 302 received. For example, the OLA/iSTFFT hardware 160 may perform an iFFT on frequency domain data received to convert the input signal from the frequency domain into the time domain. The result of the signal conversion performed by the OLA/iSTFFT hardware 160 may be a time domain input signal or time domain data about the frequency domain input signal 300, which may be referred to as the OLA/iSTFFT output data 304 and may be configured to be processed by the computing module 115.

The processing module 110 may receive or access the time domain OLA/iSTFFT output data 304 as a time domain input signal or time domain input data, referred to as time domain input data 306. The time domain input data 306 may be, or may be the same as, the time domain OLA/iSTFFT output data 304. One or more of the time domain OLA/iSTFFT output data 304 or time domain input data 306 may be represented in a domain or format that may be used by the processing module 110 of the device 100 for processing or other algorithms.

In some systems, the time domain OLA/iSTFFT output data 304 may first be sent to, or accessible to, the remote medium-speed memory 140, after which the processing module 110 may receive the time domain input data 306. In these systems, the remote medium-speed memory 140 may or may not store the time domain OLA/iSTFFT output data 304. In other systems, the time domain OLA/iSTFFT 304 may be sent directly to, or accessed directly by, the processing module 110. Though it may occur at a different point in the conversion or processing of a signal, the inputs, operation, and outputs from the OLA/iSTFFT hardware 160 in FIG. 3 may be similar to or the same as the inputs, operation, and outputs from the OLA/iSTFFT hardware 160 in FIG. 2.

The processing module 110 may receive or access the time domain input data 306 through or using the remote memory interface 130. The processing module 110 may receive or access the time domain input data 306 continuously, periodically, when triggered, or at various intervals, such as after each iFFT is performed by the OLA/iSTFFT hardware 160.

The remote memory interface 130 may send or transmit the received time domain input data 306 to the computing module 115 of the chip 110 as the processing input data 308. The processing input data 308 may be the same as, represent, or be similar to the time domain input data 306.

The processing input data 308 may be in a domain or format that may be used by or necessary for processing by the computing module 115. For example, the processing input data 308 may be time domain data where the computing module 115 desires or requires time domain signals or data in order to perform various processes, algorithms, or other tasks.

The computing module 115 may perform or apply one or more processes, algorithms, logic, code, software, or other analysis on the processing input data 308. The computing module 115 may or may not use or access other memory, such as fast internal memory 118 or slow memory 120, before, during, or after the processing of the processing input data 308. For example, code or logic with instructions for the processing performed by the computing module 115 may be stored in the fast memory 118, and accessed by the computing module 115 before or during the operation of any processing or calculations performed by the computing module 115 on the processing input data 308.

A result of the processing performed by the computing module 115 may be time domain processing output data 310. The processed time domain processing output data 310 may then be sent to or accessed by the remote memory interface 130 of the processing module 110.

The remote medium-speed memory 140 may receive or access a time domain output signal 312 from the remote memory interface 130. The time domain output signal 312 may be the same as, represent, or be similar to the time domain processing output data 310.

While the processing input data 308 is shown as being sent directly to the computing module 115, in some systems, the time domain input signal 306 or the processing input data 308 may be stored in memory on or accessible to the processing module 110, such as internal fast memory 118 or slow memory 120, prior to, during, or after being received or accessed by the computing module 115. Additionally or alternatively, while the processing output data 310 is shown as being sent directly to the remote memory interface 130, in some systems, the processing output data 310 may be stored in memory on or accessible to the processing module 110, such as internal fast memory 118 or slow memory 120, prior to, during, or after being sent to or accessed by the remote memory interface 130.

The remote medium-speed memory 140 may access and/or store the time domain output signal or data about the time domain output signal, referred to as time domain output signal data 314. Storage of the time domain output signal data 314 in the remote medium-speed memory 140 may occur continuously, periodically, when triggered, at intervals, such as at every interval where the computing module 115 has completed processing the processing input data 308 and has outputted the processing output data 310, or at various other times.

The stored time domain output signal data 314 may be sent to, or accessed by the OLA/STFFT hardware 150. The OLA/STFFT hardware 150 may receive or access the time domain output signal data 314 continuously, periodically, when triggered, or at various intervals, such as when a buffer in the remote medium-speed memory 140 is full or nearly full of samples or data about the time domain output signal 312 or at each time interval that the OLA/iSTFFT hardware 160 receives frequency domain input signal data 302 from the remote medium-speed memory 140. In other systems, the time domain output signal 312 may be sent directly to the OLA/STFFT hardware 150 without storing any time domain output signal data 314 in the remote medium-speed memory 140.

The OLA/STFFT hardware 150 may perform a signal conversion on the time domain output signal data 314 received. For example, the OLA/STFFT hardware 150 may perform a FFT on time domain output signal samples received to convert the output signal from the time domain into the frequency domain. The result of the signal conversion performed by the OLA/STFFT hardware 150 may be a frequency domain output signal or frequency domain data about the time domain output signal 312, which may be referred to as the OLA/STFFT output data 316. Though it may occur at a different point in the conversion or processing of a signal, the inputs, operation, and outputs from the OLA/STFFT hardware 150 in FIG. 3 may be similar to or the same as the inputs, operation, and outputs from the OLA/STFFT hardware 150 in FIG. 2.

The processing module 110 may receive or access the frequency domain OLA/STFFT output data 316 as a frequency domain output signal or frequency domain output data, referred to as frequency domain output signal 218. The frequency domain output signal 218 may be, or may be the same as, the frequency domain OLA/STFFT output data 316. One or more of the frequency domain OLA/STFFT output data 316 or frequency domain output signal 318 may be represented in a domain or format that may be useful to output signal destinations 190. The frequency domain output signal 318 may be similar to or the same as the output signal 195.

In some systems, the frequency domain OLA/STFFT output data 316 may be sent to, or otherwise accessible to, the remote medium-speed memory 140, after which the output signal destinations 190 may receive the frequency domain output signal 318. In these systems, the remote medium-speed memory 140 may or may not store the frequency domain OLA/STFFT output data 316. In other systems, the frequency domain OLA/STFFT output data 316 may be sent directly to, or accessed directly by, the output signal destinations 190.

While FIG. 3 shows a frequency domain input signal 300 and a frequency domain output signal 318, it should be appreciated that the system could be modified depending on the type of input signal 300 received and/or the type of output signal desired. For example, where the input signal 300 is a time domain signal, the system may eliminate the use of the OLA/iSTFFT hardware 160. In this example, the input signal 300 may be sent as a time domain input signal 306 to the processing module 110 for processing. As another example, where a time domain output signal 318 is desired by one or more output signal destinations 190, the device 100 may eliminate the use of the OLA/STFFT hardware 150. In this example, the output signal 318 may be or reflect the time domain output signal 310 from the computing module 115. Various other examples are possible.

Figure 4:
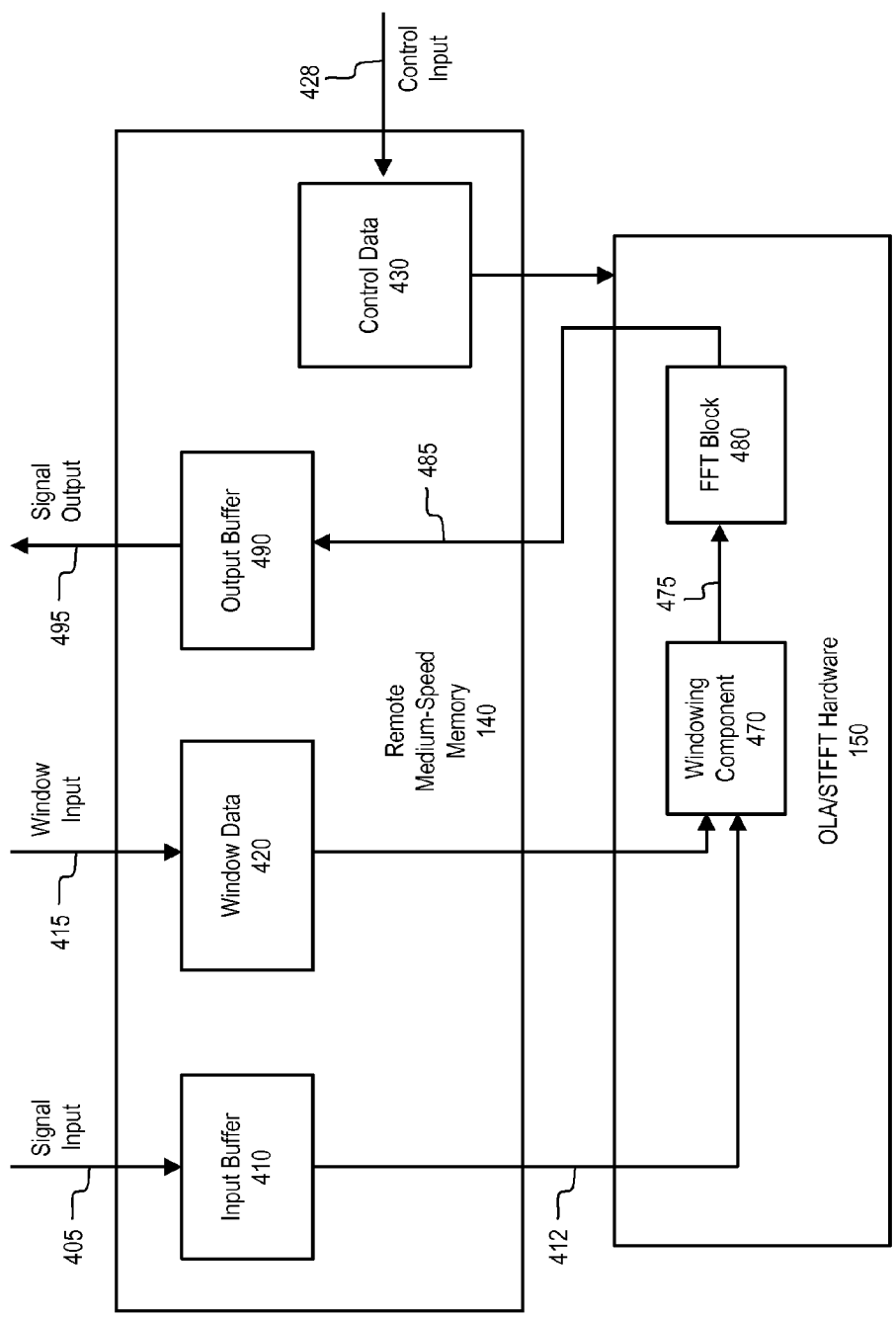
FIG. 4 is a block diagram of an example of components of a device for converting a signal.

FIG. 4 is a block diagram of an example remote medium-speed memory 140 and OLA/STFFT hardware 150, and illustrates how the remote medium-speed memory 140 may interact and operate with the OLA/STFFT hardware 150 to convert a signal from the time domain to the frequency domain remotely and distinctly from the processing module 110 of the device 100.

The remote medium-speed memory 140 may receive a signal or data about a signal, such as signal input 405. The signal input 405 may be received continuously, periodically, at one or more intervals, or at various times. The signal input 405 may be a time domain signal or data about a time domain signal, and may be the same as or similar to the input signal 105, the time domain input signal 200, or the time domain output signal 312.

The remote medium-speed memory 140 may include a buffer 410, which may store the signal input 405. For example, the remote medium-speed memory 140 may continuously or periodically receive a time domain signal sample, and may store each received time domain signal sample in the buffer 410. Where the signal input 405 is a time domain signal, an additional component may be provided which may receive the time domain signal and generate or gather data or samples from the time domain signal, which are then stored in the buffer 410 of the remote medium-speed memory 140.

The signal input 405 stored in the buffer 410 may be sent to or accessed by the OLA/STFFT hardware 150. The signal input 405 may be received by the OLA/STFFT hardware 150 continuously, periodically, when triggered, or at various intervals or other times. For example, when enough signal input data has been stored in the buffer 410 to perform a signal conversion, the buffer 410 may send the stored signal input 405 to the OLA/STFFT hardware 150 as buffered input data 412 for performance of a FFT on the buffered input data 412. As an example, where the OLA/STFFT hardware 150 is configured to perform a 1024 point FFT, the buffer 410 may store received signal input 405 in the form of time domain signal samples until 1024 samples have been received and stored in the buffer 410. Once 1024 samples have been stored in the buffer 410, the remote medium-speed memory 140 may send, or the OLA/STFFT hardware 150 may otherwise access, the samples as buffered input data 412. Once the buffered input data 412 have been sent to or accessed by the OLA/STFFT hardware 150, the time domain signal samples stored in the buffer 410 may be shifted, partially shifted, wrapped, partially wrapped, cleared, partially cleared, removed, or otherwise deleted or altered in various ways, and the buffer 410 may again begin storing new time domain signal samples as they are received by the remote medium-speed memory 140.

The remote medium-speed memory 140 may also or alternatively receive window input data such as a window input 415. Window input 415 may include code, logic, instructions, information or data regarding a window function to be performed on the buffered input data 412 by the OLA/STFFT hardware 150. A window function may be a mathematical function that is zero-valued outside of a chosen interval. When a signal or data, such as the buffered input data 412, is multiplied by the window function, the product is also zero-valued outside the interval, and all that is left is the part where they overlap. For instance, a function that is constant inside the interval and zero elsewhere is called a rectangular window, which describes the shape of its graphical representation. Various other window functions are possible, such as a triangular window, a cosine window, a flat top window, an exponential window, a Gaussian window, a Hann window, a Bartlett-Hann window, a Hamming window, a Tukey window, a Lanczos window, a Blackman window, a Blackman-Harris window, a Blackman-Nuttall window, a Kaiser window, a Bessel window, a Dolph-Chebyshev window, a Nuttall window, a Hann-Poisson window, a Rife-Vincent window, a Slepian window, square roots of any of these windows, or various other windows or combinations of windows. A window function may be applied to a set of data before performing an FFT to reduce or eliminate artifacts from the FFT or to reduce the abruptness of the FFT at each transition.

In some systems, such as systems where a signal may be first converted or transformed from a first domain to a second domain using an OLA/STFFT hardware 150, then processed, then reconverted or retransformed back to the first domain using an OLA/iSTFFT hardware 160, the window functions of the OLA/STFFT hardware 150 and OLA/iSTFFT hardware 160 (discussed below) may be determined, selected, chosen, or implemented as complementary window functions. For example, in some systems, the OLA/STFFT hardware 150 may include a first window function, which may be referred to as an analysis window, and the OLA/iSTFFT hardware 160 may include a second window function, which may be referred to as a reconstruction window or a synthesis window. The analysis window and the synthesis window may be configured such that the combined effect of the two window functions, in the absence of any intermediary processing, is equal to 1 or unity, and/or provides perfect reconstruction. Though the analysis window is described with reference to the OLA/STFFT hardware 150 and the synthesis window is described with reference to the OLA/iSTFFT hardware 160, in other systems, these may be reversed. As one specific example, the analysis window (or a window of the OLA/STFFT hardware 150) and the synthesis window (or a window of the OLA/iSTFFT hardware 160) may be a square root of a Hamming window or a Hann window. Various other examples and variations are possible.

Window input 415 may, for example, be provided to the remote medium-speed memory 140 by the computing module 115 or another component of the processing module 110 to control the window function to be applied during the performance of an FFT by the OLA/STFFT hardware 150. In other systems, the window input 415 may be provided to the remote medium-speed memory 140 by one or more other devices, software, logic, hardware that may be configured or operable to supply this information the remote medium-speed memory 140 and/or determine and designate an appropriate window function to be performed.

The window input 415 received by the remote medium-speed memory 140 and/or window function or functions identified by the window input 415 may be stored in the remote medium-speed memory 140 as window data 420. The window data 420 may be provided to the OLA/STFFT hardware 150, such as to a windowing component 470 of the OLA/STFFT hardware 150, prior to or at any point during the operation of one or more FFTs by the OLA/STFFT hardware 150. In some systems, window data 420 is received by the remote medium-speed memory 140 and/or provided to the OLA/STFFT hardware 150 during a set-up or initialization stage or at a time prior to the receipt of the signal input 405 or performance of the FFTs by the OLA/STFFT hardware 150. This may be done to ensure that continuously performed FFTs are each performed consistently and using the same window function. However, the window data may be received or modified at any time during the operation of the remote medium-speed memory 140 and/or OLA/STFFT hardware 150. In some systems, a window input 415 or window data 420 may be directly received by the OLA/STFFT hardware 150, without passing first through the remote medium-speed memory 140. Other variations are possible.

The remote medium-speed memory 140 may also or alternatively receive control input data, such as control input 428. The control input 428 may be stored in the remote medium-speed memory 140 as control data 430. The control data 430 may additionally or alternatively be sent to or accessed by the OLA/STFFT hardware 150. In some systems, the control input 428 may also interface or be sent directly to the OLA/STFFT hardware 150 without passing through the remote medium-speed memory 140.

Control input 428 may, for example, be provided by the computing module 115 or another component of the processing module 110 to control one or more functions or operations of the remote medium-speed memory 140, the buffer 410, or the OLA/STFFT hardware 150. For example, a programmer may write software or code identifying or defining control parameters for signal conversions, which may then be sent to the remote medium-speed memory 140 as control input 428. In other systems, the control data 428 may be provided to the remote medium-speed memory 140 by one or more other devices, software, logic, hardware that may be configured or operable to supply this information the remote medium-speed memory 140 and/or determine and designate an appropriate control functions to be performed.

The control data 430 may identify, determine, designate, or otherwise control one or more functions of the remote medium-speed memory 140. As an example, the control data 430 may designate how many samples or other data about a signal input 405 the remote medium-speed memory 140 needs to collect or store in the buffer 410 prior to sending the data to the OLA/STFFT hardware 150 or performing an FFT. Other examples are possible.

The control data 430 may also or alternatively identify, determine, designate, or otherwise control one or more functions of the OLA/STFFT hardware 150. For example, the control data 430 may identify or designate some or all of the parameters regarding the performance of an FFT by the OLA/STFFT hardware 150, such as what algorithm the OLA/STFFT hardware 150 is to use to perform the FFT, how often the FFT is to be performed, or a transform size indicating how large or how many samples will be used when performing the FFT. Various other examples of control data 430 and functions controlled by control data 430 are possible.

The control data 430 may be provided to the OLA/STFFT hardware 150 prior to or at any point during the operation of one or more FFTs by the OLA/STFFT hardware 150. In some systems, control data 430 is received by the remote medium-speed memory 140 and/or provided to the OLA/STFFT hardware 150 during a set-up or initialization stage or at a time prior to the receipt of the input data or performance of the FFTs by the OLA/STFFT hardware 150. This may be done to ensure that continuously performed FFTs are each performed according to the same or constant FFT parameters. However, a control input 428 may be received and may set up or modify control data 430 at any time during the operation of the remote medium-speed memory 140 and/or OLA/STFFT hardware 150.

In some systems, window inputs 415 and control inputs 428 are received, and window data 420 and control data 430 is stored, prior to the operation of any buffering of data by the remote medium-speed memory 140 and before any FFTs are performed by the OLA/STFFT hardware 150.

At a given time, such as upon receipt of a signal input 405, or in response to a command, such as a command sent as a control input 428, the remote medium-speed memory 140 and the OLA/STFFT hardware 150 may begin converting a received signal input 405.

During the operation of the remote medium-speed memory 140 and the OLA/STFFT hardware 150 in a signal conversion mode, the buffer 410 of the remote medium-speed memory 140 may fill with data about a received signal input 405, such as time domain signal samples. When the buffer 410 has stored a designated or required number of samples, the samples may be sent to, or accessed by, the OLA/STFFT hardware 150, as buffered input data 412. The designated number of samples may be a number of samples identified or determined by the control data 430 as the number necessary for the OLA/STFFT hardware 150 to perform the desired FFT on the data. Various other examples are possible.

The buffered input data 412 received by the OLA/STFFT hardware 150 may be directed to a windowing component 470. At the windowing component 470, the OLA/STFFT hardware 150 may perform a windowing function on the buffered input data 412 acquired from the remote medium-speed memory 140. The window function performed by the OLA/STFFT hardware 150 may be the window function identified or designated by the window data 420 of the remote medium-speed memory 140. For example, in some systems, the windowing component 470 of the OLA/STFFT hardware 150 may multiply the buffered input data 412 by the window function identified by the window data 420. Other examples are possible.

The output of the windowing component 470 may be buffered and windowed input data 475. The buffered and windowed input data 475 may be sent to or accessed by an FFT block 480 of the OLA/STFFT hardware 150. At the FFT block 480, the hardware OLA/STFFT 150 may perform an FFT on the buffered and windowed input data 475. For example, the OLA/STFFT hardware 150 may apply an FFT algorithm or perform one or more computations on the buffered and windowed input data 475 to obtain frequency domain output data 485 that may reflect or represent the time domain signal input 405. The FFT algorithm or computations performed by the FFT block 480 of the OLA/STFFT hardware 150 may be specified or determined by the control input 428 and control data 430.

In some systems, the computing module 115 of the processing module 110 may provide the control input 428 to the remote medium-speed memory 140 in order to instruct the OLA/STFFT hardware 150 to generate frequency domain output data 485 in the desired form and as often as needed. Accordingly, in these systems, the OLA/STFFT hardware 150 may perform the FFT or algorithm as often as specified by the control data 430 and/or as often as data is received from the buffer 410.

The FFT block 480 may include input/output ("I/O") buffer pointers which may be used to identify stored data used by or resulting from the FFT. In some instances, such as where the FFT block 480 is configured or operable to perform an FFT on a sample set which is smaller than the FFT to be performed, the FFT block 480 may use zero-pad data to fill in the sample set and perform the FFT.

The result of the FFT performed by the FFT block 480 of the OLA/STFFT hardware 150 may be frequency domain output data 485. The frequency domain output data 485 from the FFT block 480 of the OLA/STFFT hardware 150 may be in a form and domain useful for frequency domain processing or analysis to be performed by the computing module 115 or processing module 110.

The frequency domain output data 485 may be sent to the remote medium-speed memory 140. The remote medium-speed memory 140 may store the frequency domain output data 485, such as in one or more output buffers 490. The buffered output data may be sent to, or accessed by, one or more computing modules, such as the computing module 115 of the processing module 110, as a signal output 495. The signal output 495 may be or represent the buffered output data 485 stored in the output buffer 490, and may be sent, output, or accessed continuously, periodically, when triggered by an event, at an interval, or at various other times. The computing module 115 may then perform one or more frequency domain processes or analysis, such as various surround sound, noise reduction, or de-reverberation algorithms, on the frequency domain output data 485 and output signal 495. In other configurations, such as those shown in FIG. 3, the output signal 495 may be sent to one or more output signal destinations 190.

The OLA/STFFT hardware 150 may operate continuously. Operation of the OLA/STFFT hardware 150 may be modified at any point by sending a control input 428 to the remote medium-speed memory 140 that modifies one or more parameters of the signal conversion. For example, the size of the FFT, the percentage of overlap, coefficient pointers, the window function, and other parameters of the OLA/STFFT hardware 150 may be modified by a programmer dynamically, on the fly, and as needed.

In addition to a windowing component 470 and FFT block 480, the OLA/STFFT hardware 150 may include a transform size or transform component. A transform component may store or control a size of the signal conversion to be performed by the OLA/STFFT hardware 150. The transform size stored by the transform component may be specified by the control input 428 or the control data 430. Additionally, though shown as not including an overlap/add component, in some systems, the OLA/STFFT hardware 150 may include an overlap/add component like overlap/add component 680 discussed later. Such an overlap/add component may, for example, use perfect reconstruction overlap and add ("PROLA") techniques as discussed.

While the frequency domain output data 485 from the OLA/STFFT hardware 150 is shown in FIG. 4 as being sent to and stored by the remote medium-speed memory 140, in other systems, the frequency domain output data 485 may be sent directly or indirectly to one or more output signal destinations or components of the processing module 110. For example, the frequency domain output data 485 may be sent or otherwise accessed and stored directly in the internal fast memory 118 of the chip for use by the computing module 115, or may be sent directly to or otherwise accessed by the computing module 115 for immediate processing or analysis. Other variations are possible.

Figure 5:
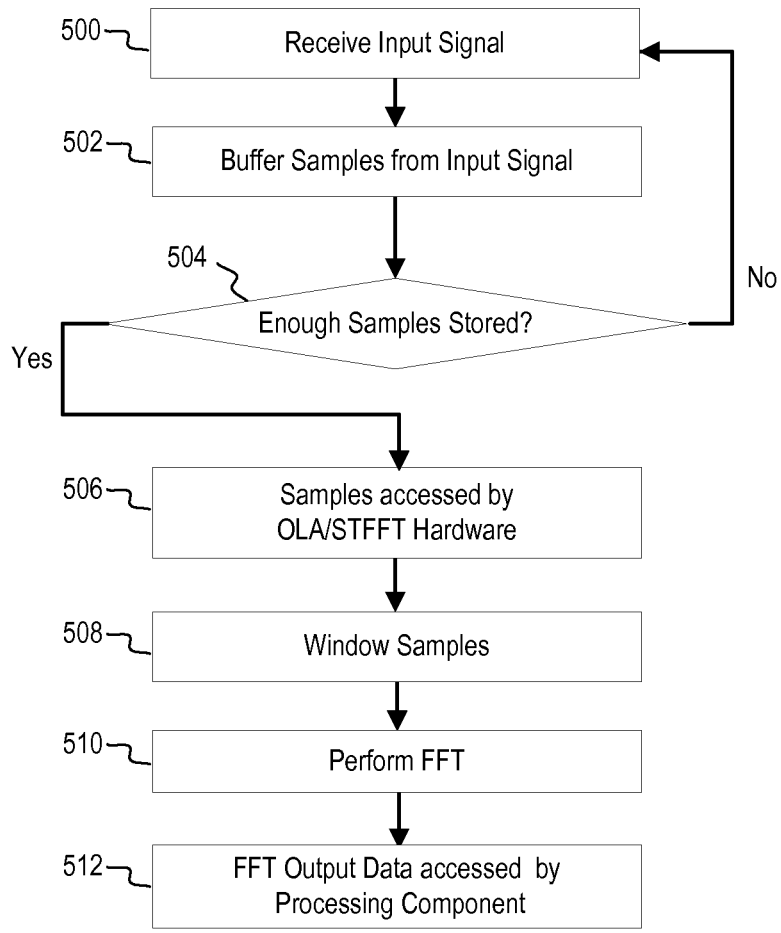
FIG. 5 is a flow diagram of an example method for converting a signal using a device for performing signal conversion.

FIG. 5 illustrates one example method of how the system of FIG. 4 may perform a signal conversion on a continuously received input signal. The method of FIG. 5 begins at block 500, where a time domain input signal is received. The input signal may be received continuously. As another example, the input signal may be samples from a time domain signal which may be received at intervals determined by the rate of sampling of the time domain signal. Various other examples are possible.

At block 502, samples from the input signal are buffered, such as with or using the buffer 410 of the remote medium-speed memory 140. Where the input signal is a continuous time domain signal, an additional component may be used to generate samples are specified time intervals of the input signal. These generated samples may then be stored using the buffer 410.

At block 504, a determination may be made as to whether or not enough samples have been stored in the buffer 410 of the remote medium-speed memory 140. The number of samples that may be buffered or needed to be buffered may be determined or specified by control data, such as the control data 430, or may be determined or specified by the size of the FFT or frequency of the performance of the FFT by the OLA/STFFT hardware 150. Where not enough samples have been stored, the method may return to block 500 and 502, where the input signal may continue to be received and samples from the input signal may continue to be buffered.

Where enough samples have been received, the method may proceed to block 506, where the samples may be transmitted or otherwise accessed by the OLA/STFFT hardware 150 for use with the FFT. At block 508, the samples may be windowed, such as by the windowing component 470 of the OLA/STFFT hardware 150. Windowing of the samples may be performed according to the window input 415 and window data 420 or window functions specified by the window data 420 stored in the remote medium-speed memory 140.

At block 510, the FFT block 480 of the OLA/STFFT hardware 150 may perform the FFT on the windowed sample data. The FFT performed may be specified or determined by the control input 428, the control data 430, and the characteristics and properties of the FFT block 480 and the OLA/STFFT hardware 150.

Then, at block 512, the FFT output data 485 or signal output 495 may be transmitted to or otherwise accessed by the computing module 115. For example, the output data 485 may be saved in the remote medium-speed memory 140, and may be transmitted to the processing module 110 through the remote memory interface 130 as signal output 495. As another example, the OLA/STFFT hardware 115 may send the output data 485 directly to the processing module 110, bypassing the remote medium-speed memory 140.

While the method of FIG. 5 shows one iteration of how an input signal may be converted using the remote medium-speed memory 140 and the OLA/STFFT hardware 150, the method may be performed in a repeated or continuous fashion, with one or more steps of the method performed simultaneously. For example, as the samples may be accessed by the OLA/STFFT hardware 150 in block 506, the buffer 410 of the remote medium-speed memory 140 may continue to receive and buffer new input signals for use with subsequent FFTs. In this way, once the OLA/STFFT hardware 150 has performed the FFT and the output data has been sent from the OLA/STFFT hardware 150 to the remote medium-speed memory 140 or the computing module 115, the OLA/STFFT hardware 150 may immediately or shortly thereafter access the new set of samples that the buffer 410 was gathering while the OLA/STFFT hardware 150 was performing the previous FFT on the previous set of data. Various other examples are possible.

Figure 6:
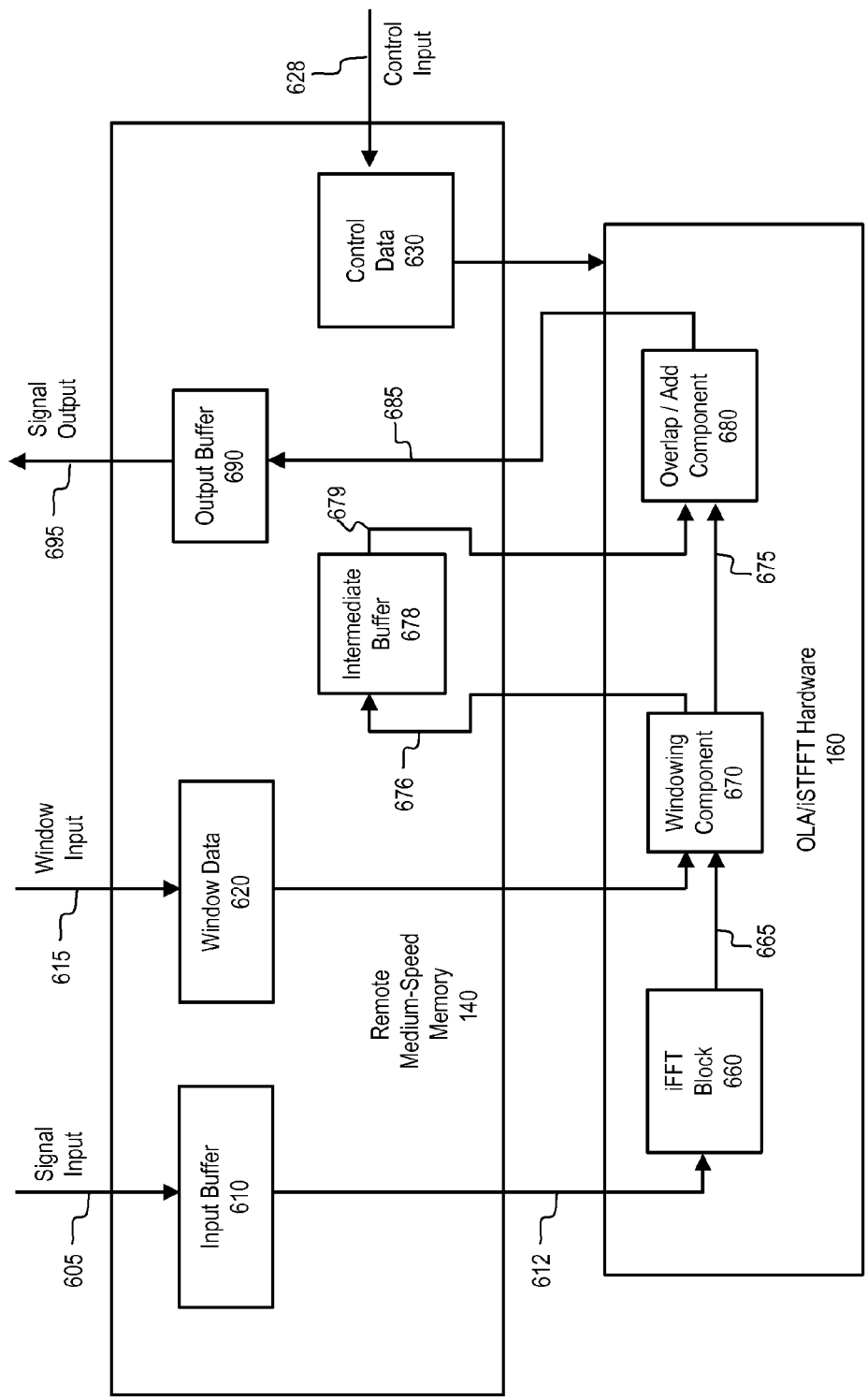
FIG. 6 is a block diagram of an example of components of a device for converting a signal.

FIG. 6 is a block diagram of an example remote medium-speed memory 140 and OLA/iSTFFT hardware 160, and illustrates how the remote medium-speed memory 140 may interact and operate with the OLA/iSTFFT hardware 160 to convert a signal from the frequency domain to the time domain remotely and distinctly from the processing module 110 of the device 100.

As with the OLA/STFFT hardware 150, the remote medium-speed memory 140 may receive window input 615, which may include information or data regarding a window function to be performed on data by the OLA/iSTFFT hardware 160. The window function may be the same as, or similar to, any of the window functions discussed with OLA/STFFT hardware 150. The window functions for the OLA/STFFT hardware 150 and the OLA/iSTFFT hardware 160 may be the same or different. In some configurations or systems, the window function of the OLA/STFFT 150 and the OLA/iSTFFT 160 may be complementary window functions, may provide a combined effect of unity, and/or may provide perfect reconstruction of a signal absent any intermediary processing. Window input 615 may be provided in any manner as discussed with respect to window input 415.

The window input 615 received by the remote medium-speed memory 140 and/or window function or functions identified by the window input 615 may be stored in the remote medium-speed memory 140 as window data 620. The window data 620 may be provided to the OLA/iSTFFT hardware 160, such as to a windowing component 670 of the OLA/iSTFFT hardware 160, prior to or at any point during the operation of one or more iFFTs by the OLA/iSTFFT hardware 160. As with the OLA/STFFT hardware 150, in some systems, window data 620 is received by the remote medium-speed memory 140 and/or provided to the OLA/iSTFFT hardware 160 during a set-up or initialization stage or at a time prior to the receipt of the signal input 605 or performance of the iFFTs by the OLA/iSTFFT hardware 160 to ensure that continuously performed iFFTs are each performed consistently and using the same window function.

The remote medium-speed memory 140 may also or alternatively receive control input 628, and may be stored in the remote medium-speed memory 140 as control data 630. The control input 628 or control data 630 may additionally or alternatively be sent directly to or accessed directly by the OLA/iSTFFT hardware 160 without passing through or being filtered by the remote medium-speed memory 140. The control input 628 may be provided by any of the components that may provide control input 428. The control data 630 may identify, determine, designate, or otherwise control one or more functions of the remote medium-speed memory 140 in a manner similar to the control data 430. The control data 630 may also or alternatively identify, determine, designate, or otherwise control one or more functions of the OLA/iSTFFT hardware 160, such as some or all of the parameters regarding the performance of an iFFT by the OLA/iSTFFT hardware 160, what algorithm the OLA/iSTFFT hardware 160 is to use to perform the iFFT, how often the iFFT is to be performed, a transform size indicating how large the iFFT will be, or a percent OLA indication identifying what percentage of samples may be overlapped and added together. Various other examples of control data 630 and functions controlled by control data 630 are possible.

As with control data 430, the control data 630 may be provided to the OLA/iSTFFT hardware 160 prior to or at any point during the operation of one or more iFFTs by the OLA/iSTFFT hardware 160. In some systems, window inputs 615 and control inputs 628 are received, and window data 620 and control data 630 is stored, prior to the operation of any buffering of data by the remote medium-speed memory 140 and before any iFFTs are performed by the OLA/iSTFFT hardware 160. At a given time, such as upon receipt of a signal input 605, or in response to a command, such as a command sent as a control input 628, the remote medium-speed memory 140 and the OLA/iSTFFT hardware 160 may begin converting a received signal input 605.

The remote medium-speed memory 140 may receive a signal or data about a signal, such as signal input 605. The signal input 605 may be received continuously, periodically, at one or more intervals, or at various times. The signal input 605 may be a frequency domain signal or data about a frequency domain signal, and may be the same as or similar to the input signal 105, the frequency domain output signal 212, or the frequency domain input signal 300.

The remote medium-speed memory 140 may gather and store input data, such as the signal input 605 or data about the signal input 605 continuously or periodically. The signal input 605 or data may be stored in buffer 610.

The buffered input data 612 stored in the buffer 610 may be sent to or accessed by the OLA/iSTFFT hardware 160. The buffered input data 612 may be received by the OLA/iSTFFT hardware 160 continuously, periodically, when triggered, or at various intervals or other times. For example, where buffer 610 is full of data, or where buffer 610 has stored enough buffered input data 612 to perform a signal conversion, the buffered input data 612 may be sent to or accessed by the OLA/iSTFFT hardware 160. The designated number of samples that may be stored before sending the input data 612 may be a number of samples identified or determined by the control data 630 as the number necessary for the OLA/iSTFFT hardware 160 to perform the desired iFFT on the data.

The buffered input data 612 may be sent to or accessed by an iFFT block 660 of the OLA/iSTFFT hardware 160. At the iFFT block 660, the hardware OLA/iSTFFT 160 may perform an iFFT on the buffered input data 612. For example, the OLA/iSTFFT hardware 160 may apply an iFFT algorithm or perform one or more computations on the buffered input data 612 to obtain time domain data 665 that may reflect or represent the frequency domain signal input 605. The iFFT algorithm or computations performed by the iFFT block 660 of the OLA/iSTFFT hardware 160 may be specified or determined by the control input 628 and control data 630.

The time domain data 665 may be directed to a windowing component 670 of the OLA/iSTFFT hardware 160. At the windowing component 670, the OLA/iSTFFT hardware 160 may perform a windowing function on the time domain data 665 in a manner similar to or the same as how the windowing component 470 performs a windowing function on the buffered input data 412 in the OLA/STFFT hardware 150.

A result of the functions performed by the windowing component 670 may be or include windowed time domain data 675 and 676. In some systems, windowed time domain data 675 may correspond to an initial, first, or beginning portion of the windowed data output from the windowing component 670, and windowed time domain data 676 may correspond to a subsequent, later, or end portion of the windowed data output from the windowing component 670. For example, a first half of the windowed data output from the windowing component 670 may be windowed time domain data 675, and the second half of the windowed data output from the windowing component 670 may be windowed time domain data 676. In other systems, the windowed time domain data 675 and 676 may be the same or may comprise other portions of the windowed data output from the windowing component 670. For example, all of the windowed data output from the windowing component 670 may be sent to or accessed by both the intermediate buffer 678 and the overlap/add component 680. Other variations are possible.

The windowed time domain data 675 may be directed to and/or received by an overlap/add component 680. The windowed time domain data 676 may be directed to and/or received and stored by an intermediate buffer 678. The intermediate buffer 678 may store a portion or all of the windowed time domain data 676 for one cycle or iteration of processing. During a subsequent cycle or iteration, such as at the next time that the iFFT block 660 performs an iFFT or the windowing component 670 outputs windowed data, the intermediate buffer 678 may supply the stored windowed time domain data 676 as previous windowed time domain data 679 to the overlap/add component 680. In this way, the intermediate buffer 678 may act to store a portion of windowed time domain data 676 from a previous inverse FFT function to be used by the overlap/add component 680 to overlap with a portion of the present windowed time domain data 675. In some systems, the intermediate buffer 678 may include two buffers with a first of the two buffers filling first, and then the second buffer filling, and after which the buffers take turns being cleared and filling with new samples. In this example, the previous windowed time domain data 679 may include part or all of the windowed time domain data 676 in the most recently filled of the two buffers. More than two buffers may be included in the intermediate buffer 676 and used in various forms.

As such, in some systems, the overlap/add component 680 may receive some or all present windowed time domain data 675 and some or all previous windowed time domain data 679. While the system in FIG. 6 shows two sets of windowed time domain data 675 and 676, in still other systems, only windowed time domain data 675 may exist and be output from the windowing component 670 to the overlap/add component 680. Other examples are possible. Other variations are possible.

The overlap/add component 680 may include a percent OLA indicator, which may indicate what percentage of overlap may be implemented on the data. At the overlap/add component 680, the OLA/iSTFFT hardware 160 may add, overlap, or otherwise join the windowed time domain data 675 with the previous windowed time domain data 679. In cases where the two sets of data 675 and 679 overlap, the overlap/add component 680 may account for the overlap in the two sets of data 675 and 679 by eliminating a portion of the data from one of the data sets which overlaps with data from the second data set. The overlap/add component 680 may use or perform one or more PROLA overlapping techniques. The buffered and overlapped/added time domain output data 685 may then be output, sent to or otherwise accessed by the remote medium-speed memory 140. In some systems, the overlap/add component 680 may be skipped or eliminated from the OLA/iSTFFT hardware 160, and the windowed time domain data 675 and/or 679 may be sent or accessed directly by the remote medium-speed memory 140 as output data. Other functions and operations are possible.

The time domain output data 685 may be sent to the remote medium-speed memory 140. The remote medium-speed memory 140 may store the time domain output data 685 in one or more output buffers 690. The buffered time domain output data 685 may be sent to, or accessed by, one or more output signal destinations 190 as a time domain signal output 695. The signal output 695 may be or represent the output data 685, and may be sent, output, or accessed continuously, periodically, when triggered by an event, at an interval, or at various other times. For example, the time domain signal output 695 may be an audio signal which may be sent to one or more speakers to be audibly output by the speakers. Other examples are possible.

In other systems, one or more computing modules, such as the computing module 115 of the processing module 110, may receive the signal output 695. This may occur, for example, in the example shown in FIG. 3 where the OLA/iSTFFT hardware 160 is used for converting a signal to a time domain prior to any processing of the signal by the processing module 110.

In some systems, the computing module 115 of the processing module 110 may provide the control input 628 to the remote medium-speed memory 140 in order to instruct the OLA/iSTFFT hardware 160 to generate time domain output data 685 in the desired form and as often as needed. Accordingly, in these systems, the OLA/iSTFFT hardware 160 may perform the iFFT or algorithm as often as specified by the control data 630 and/or as often as data is received from the buffer 610.

The OLA/iSTFFT hardware 160 may operate continuously. Operation of the OLA/iSTFFT hardware 160 may be modified at any point by sending a control input 628 to the remote medium-speed memory 140 or directly to the OLA/iSTFFT hardware 160 to modify one or more parameters of the signal conversion. For example, the size of the iFFT, the percentage of overlap, coefficient pointers, the window function, and other parameters of the OLA/iSTFFT hardware 160 may be modified by a program or programmer dynamically, on the fly, and as needed.

While the time domain output data 685 from the OLA/iSTFFT hardware 160 is shown in FIG. 6 as being sent to and stored by the remote medium-speed memory 140 in an output buffer 690, in other systems, the time domain output data 685 may be sent directly or indirectly to one or more output signal destinations 190 or components of the processing module 110. For example, the time domain output data 685 may be sent directly to one or more speakers to be played. Other examples and variations are possible.

Figure 7:
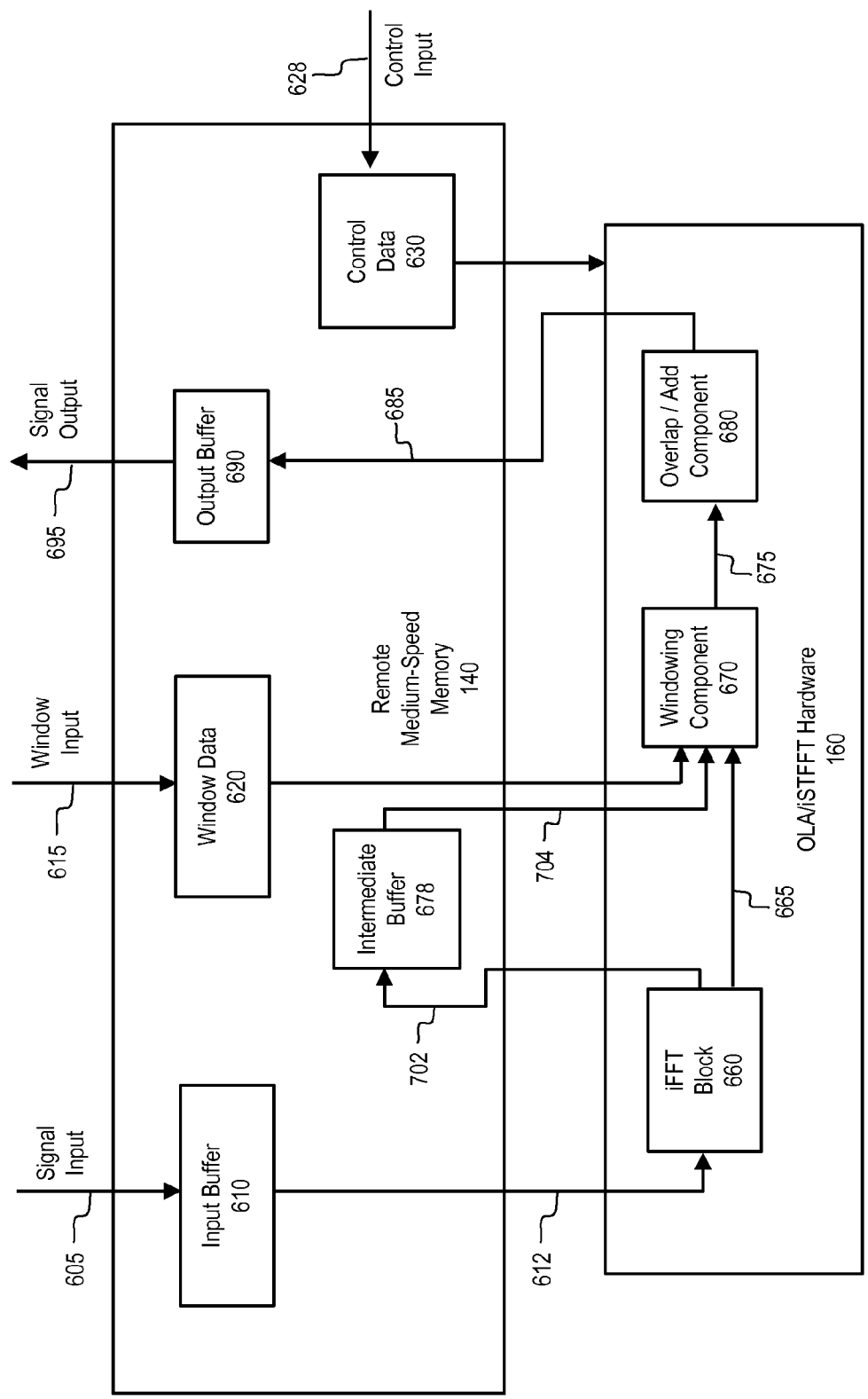
FIG. 7 is a block diagram of an example of components of a device for converting a signal.

FIG. 7 illustrates an alternative version of the remote medium-speed memory 140 and OLA/iSTFFT hardware 160. The components in the system in FIG. 7 may operate in the same or a similar fashion as like-numbered components in FIG. 6. One difference in FIG. 7 may be that in the system in FIG. 7, the iFFT block 660 may output two sets of output time domain data 665 and 702. In some systems, time domain data 665 may correspond to an initial, first, or beginning portion of the time domain data output from the iFFT block 660, and time domain data 702 may correspond to a subsequent, later, or end portion of the time domain data output from the iFFT block 660. For example, a first half of the time domain data output from the iFFT block 660 may be time domain data 665, and the second half of the time domain data output from the iFFT block 660 may be time domain data 702. In other systems, the time domain data 665 and 702 may be the same or may comprise other portions of the time domain data output from the iFFT block 660. For example, all of the time domain data output from the iFFT block 660 may be sent to or accessed by both the intermediate buffer 678 and the windowing component 670. Other variations are possible.

The time domain data 665 may be directed to and/or received by the windowing component 670. The time domain data 702 may be directed to and/or received and stored by an intermediate buffer 678. The intermediate buffer 678 may store a portion or all of the time domain data 702 for one cycle or iteration of processing. During a subsequent cycle or iteration, such as at the next time that the iFFT block 660 outputs time domain data, the intermediate buffer 678 may supply the stored time domain data 702 as previous time domain data 704 to the windowing component 670. In this way, the intermediate buffer 678 may act to store a portion of time domain data 702 from a previous inverse FFT function to be used by the windowing component 670 and/or overlap/add component 680 to window and/or overlap with a portion of the present time domain data 665. In this way, the OLA/iSTFFT hardware 160 may window and overlap present time domain data with windowed time domain data from a previous or subsequent set of time domain data. While this functionality is only shown with the OLA/iSTFFT hardware 160, it should be appreciated that an intermediate buffer such as intermediate buffer 678 may be incorporated in the OLA/STFFT hardware 150 in some systems. Other variations are possible.

Figure 8:
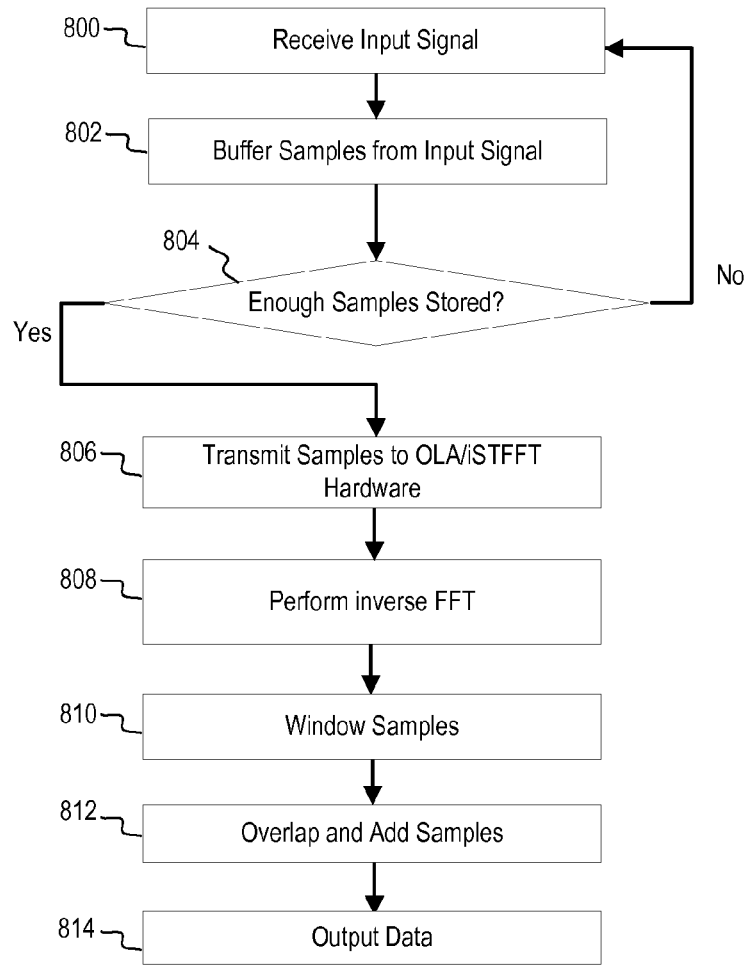
FIG. 8 is a flow diagram of an example method for converting a signal using a device for performing signal conversion.

FIG. 8 illustrates an example method of how a system, such as the system of FIG. 6 or FIG. 7, may perform a signal conversion on a continuously received input signal. The method of FIG. 8 begins at block 800, where an input signal such as frequency domain signal is received. The signal may be received continuously. As another example, the input signal may be samples from a frequency domain signal which may be received at intervals determined by the rate of sampling of the time domain signal. Various other examples are possible.

At block 802, samples from the input signal are buffered, such as with or using the buffer 610 of the remote medium-speed memory 140. Where the input signal is a continuous frequency domain signal, an additional component may be used to generate samples of the input signal. These generated samples may then be stored using the buffer 610.

At block 804, a determination may be made as to whether or not enough samples have been stored in the buffer 610 of the remote medium-speed memory 140. The number of samples that may be buffered or needed to be buffered may be determined or specified by control data, such as the control data 630, or may be determined or specified by the size of the iFFT or frequency of the performance of the iFFT by the OLA/iSTFFT hardware 160. Where not enough samples have been stored, the method may return to block 800 and 802, where the input signal may continue to be received and samples from the input signal may continue to be buffered. In some systems, the determination at block 804 may be whether or not buffer 610 is empty or full, either of which may trigger passing the samples to the OLA/iSTFFT hardware 160 for performance of the iFFT by the iFFT block 660. Other variations are possible.

Where enough samples have been received, the method may proceed to block 806, where the samples may be transmitted or otherwise accessed by the OLA/iSTFFT hardware 160 for use with the iFFT block 660. At block 808, the iFFT block 660 of the OLA/iSTFFT hardware 160 may perform the iFFT on the samples. The iFFT performed may be specified or determined by the control input 628, the control data 630, and the characteristics and properties of the iFFT block 660 and the OLA/iSTFFT hardware 160.

At block 810, time domain data may be windowed, such as by the windowing component 670 of the OLA/iSTFFT hardware 160. Windowing of the samples may be performed according to the window input 615 and window data 620 or window functions specified by the window data 620 stored in the remote medium-speed memory 140. In systems such as that in FIG. 6, the windowing performed by the windowing component 670 may be a windowing of the time domain data 665 from the iFFT block 660. In systems such as that in FIG. 7, the windowing performed by the windowing component 670 may be a windowing of both the time domain data 665 from the iFFT block 660 and the previous time domain data 704 from an intermediate buffer 678.

At block 812, windowed time domain data may be overlapped, added, or both overlapped and added together, such as with the overlap/add component 680. In systems such as that in FIG. 6, the overlapping/adding performed by the overlap/add component 680 may be an overlapping/adding of both the windowed time domain data 675 from the windowing component 670 and the previous windowed time domain data 679 from the intermediate buffer. In systems such as that in FIG. 7, the overlapping/adding performed by the overlap/add component 680 may be an overlapping/adding of just the windowed time domain data 675 from the windowing component 670. Other examples are possible.

Then, at block 814, the overlapped/added time domain output data 685 may be outputted. For example, the output data 685 may be transmitted, directly or indirectly through remote medium-speed memory 140, where it may be stored in an output buffer 690 and/or sent as a signal output 695 to the processing module 110 or to one or more output signal destinations 190. Other variations are possible.

While the method of FIG. 8 shows one iteration of how an input signal may be converted using the remote medium-speed memory 140 and the OLA/iSTFFT hardware 160, the method may be performed in a repeated or continuous fashion, with one or more steps of the method performed simultaneously. For example, as the samples may be accessed by the OLA/iSTFFT hardware 160 in block 806, the buffer 610 of the remote medium-speed memory 140 may continue to receive and buffer new input signals for use with subsequent iFFTs, as discussed. In this way, once the OLA/iSTFFT hardware 160 has performed the iFFT and the output data has been sent from the OLA/iSTFFT hardware 160 to the remote medium-speed memory 140 or the output signal destination 190, the OLA/iSTFFT hardware 160 may immediately or shortly thereafter access the new set of samples that one or more of the buffers 610 were gathering while the OLA/iSTFFT hardware 160 was performing the previous iFFT on the previous set of data. Various other examples are possible.

Buffers, such as input buffer 410, output buffer 490, input buffer 610, intermediate buffer 678, or output buffer 690, may be configured in various ways. In some systems, one or more of the buffers in the remote medium-speed memory 140 may be or include only one buffer. Information or data may be stored in a single buffer and may be transmitted or otherwise sent to or from the remote medium-speed memory 140 in various ways. For example, the data may be transmitted or otherwise sent continuously, at various times, when triggered, or at other points. Each new piece of data may, for example, replace the oldest piece of data or information in the single buffer, or parts of the buffer may be periodically cleared or erased, such as when the data has been transmitted or sent. In other systems, one or more of the input buffer 410, output buffer 490, input buffer 610, intermediate buffer 678, or output buffer 690 may include two or more buffers. As an example, a buffer may include two buffers operating in a ping-pong fashion. A first of the two buffers may be filled with data first, and then the second buffer may be filled with data. When the second buffer is full, the data in the first buffer (or both buffers) may be output, after which the first buffer may be cleared and filled with even more recent samples. After the first buffer is again full, the data in the second buffer (or both buffers) may be output, after which the second buffer may be cleared and filled with even more recent samples. The process may continue back and forth or in this ping-pong fashion. As an example of a ping-pong buffer configuration, the input buffer 410 of FIG. 4 may include a first buffer (ping) that may capture data for the next FFT sequence, and a second, other buffer (pong) of the input buffer 410 may be used to process a current FFT sequence. Other variations, such as variations with more than two buffers, are possible.

The use of multiple buffers for one or more the input buffer 410, output buffer 490, input buffer 610, intermediate buffer 678, or output buffer 690 may be useful in some systems. For example, in some systems, one buffer of data may be fed or otherwise transmitted to a component for use with immediate processing of the data, while a second buffer may store data for use in a subsequent processing of data. Multiple buffers may also or alternatively be used where some data stored in the buffers is desired or needed to be sent to the domain conversion hardware more than once, or where there is a data overlap in successive iterations of sending data to the hardware. Other variations and uses are possible.

In some systems, additional buffers may be included in the remote medium-speed memory 140, the OLA/STFFT hardware 150, or the OLA/iSTFFT hardware 160. For example, buffers may be used by the OLA/STFFT hardware 150 or the OLA/iSTFFT 160 to store data between, before, or after any of the conversion or processing of data or components within each of the hardwares 150 and 160. Other variations are possible.

Figure 9:
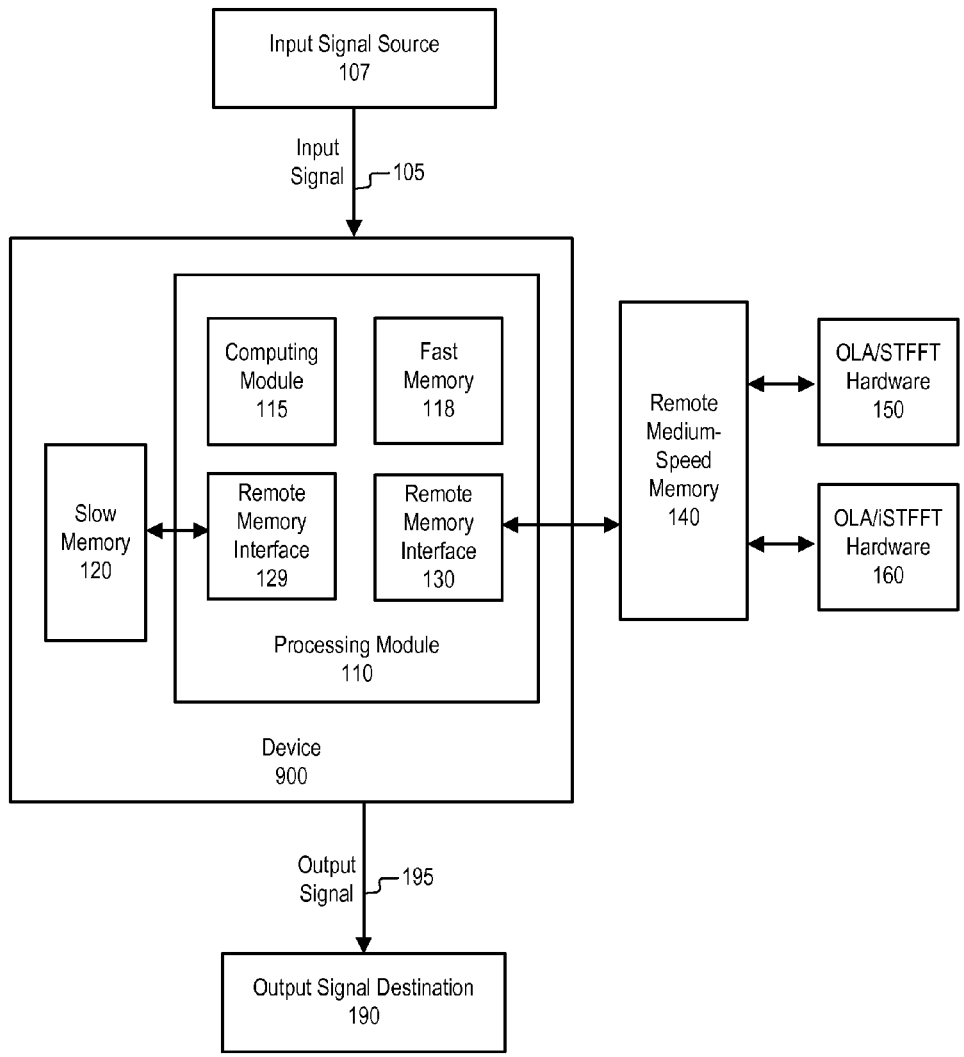
FIG. 9 is a block diagram of an example system for converting a signal.

FIG. 9 illustrates an alternative environment where one or more signals may be received by, processed through, or transmitted from a device 900. As with the device 100 in FIG. 1, device 900 may include a processing module 110 with a computing module 115, fast memory 118, and one or more remote memory interfaces 129 and 130 that may communicate or otherwise interface with a slow memory 120 and a remote medium-speed memory 140. However, unlike device 100, the device 900 may not include remote medium-speed memory 140, OLA/STFFT hardware 150 or OLA/iSTFFT hardware 160. Rather, each of the remote medium-speed memory 140, OLA/STFFT hardware 150 or OLA/iSTFFT hardware 160 may be located separately and distinctly from the device 900. For example, the device 900 may be a processor connected to a separate remote medium-speed memory 140 over a network or through a wired or wireless connection. Various other examples are possible.

The device 900 may receive an input signal 105 and may pass any data or signal that the device 900 desires to have converted to the remote medium-speed memory 140. The remote medium-speed memory 140, OLA/STFFT hardware 150, and OLA/iSTFFT hardware 160 may convert data or signals in any of the manners discussed. The remote medium-speed memory 140, OLA/STFFT hardware 150, and OLA/iSTFFT hardware 160 may relay any signals back and forth from the device 900 as desired or requested by the device 900 and in any manner discussed. The device 900 may output an output signal 195 which may be a processed and/or converted signal or data, as discussed.

While device 900 is shown as receiving an input signal 105, in other systems, the input signal 105 may be directly received from the input signal source 107 by either the remote medium-speed memory 140 or one of the OLA/STFFT hardware 150 or OLA/iSTFFT hardware 160. Additionally or alternatively, while device 900 is shown as sending an output signal 195, in other systems, the output signal 195 may be directly sent to the output signal destination 190 by either the remote medium-speed memory 140 or one of the OLA/STFFT hardware 150 or OLA/iSTFFT hardware 160. Other variations are possible.

Figure 10:
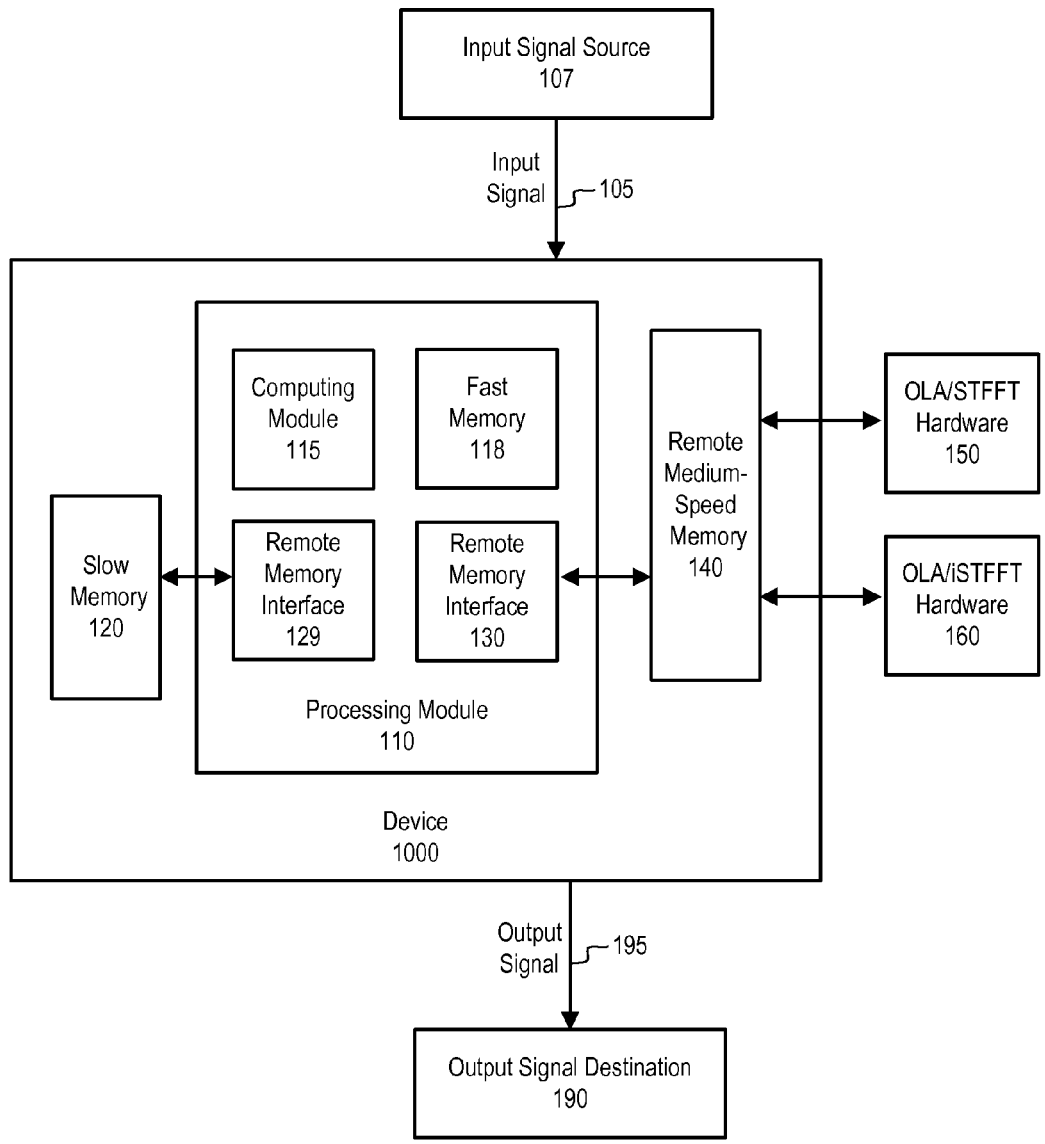
FIG. 10 is a block diagram of an example system for converting a signal.

FIG. 10 illustrates an alternative environment where one or more signals may be received by, processed through, or transmitted from a device 1000. As with the device 100 in FIG. 1, device 1000 may include a processing module 110 with a computing module 115, fast memory 118, and one or more remote memory interfaces 129 and 130 that may communicate or otherwise interface with a slow memory 120 and a remote medium-speed memory 140. Additionally, as with the device 100, the device 1000 may include remote medium-speed memory 140. However, unlike device 100, the device 1000 may not include an OLA/STFFT hardware 150 or OLA/iSTFFT hardware 160. Rather, the OLA/STFFT hardware 150 or OLA/iSTFFT hardware 160 may be located separately and distinctly from the device 1000. For example, the device 1000 may be a processor that may have one or more connection ports through which an external OLA/STFFT hardware 150 or OLA/iSTFFT hardware 160 may be connected to the processor. Various other examples are possible.

The device 1000 may receive an input signal 105 and may pass any data or signal that the device 1000 desires to have converted to the remote medium-speed memory 140 and OLA/STFFT hardware 150 or OLA/iSTFFT hardware 160. The remote medium-speed memory 140, OLA/STFFT hardware 150, and OLA/iSTFFT hardware 160 may convert data or signals in any of the manners discussed. The OLA/STFFT hardware 150 and OLA/iSTFFT hardware 160 may relay any signals or data back and forth from the remote medium-speed memory 140 of the device 1000 as desired or requested by the device 1000 and in any manner discussed. The device 1000 may output an output signal 195 which may be a processed and/or converted signal or data, as discussed.

While device 1000 is shown as receiving an input signal 105, in other systems, the input signal 105 may be received from the input signal source 107 by either the OLA/STFFT hardware 150 or OLA/iSTFFT hardware 160 directly and/or through one or more different interfaces. Additionally or alternatively, while device 1000 is shown as sending an output signal 195, in other systems, the output signal 195 may be directly sent to the output signal destination 190 by the OLA/STFFT hardware 150 or the OLA/iSTFFT hardware 160. Other variations are possible.

Figure 11:
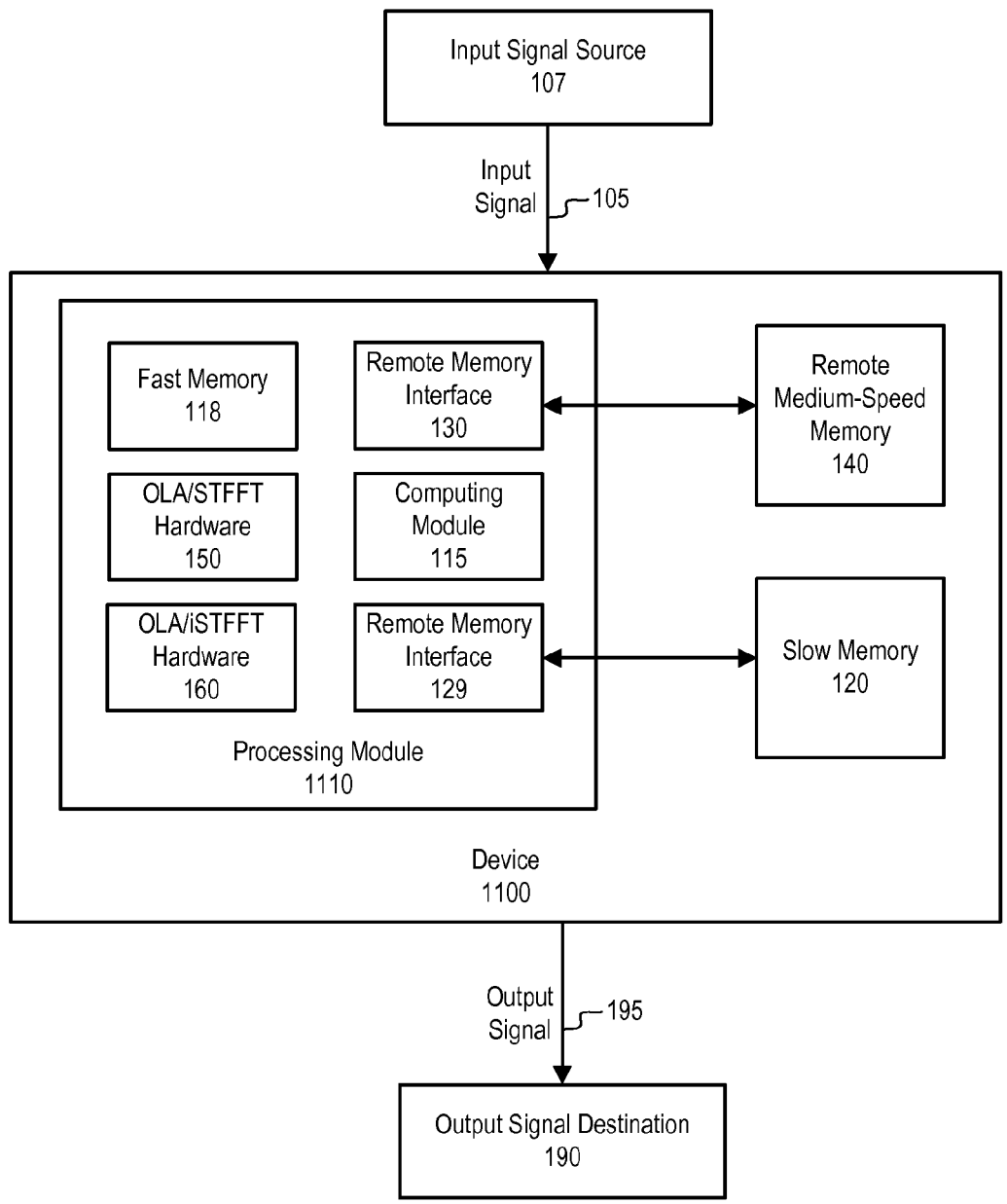
FIG. 11 is a block diagram of an example system for converting a signal.

FIG. 11 illustrates an alternative environment where one or more signals may be received by, processed through, or transmitted from a device 1100. Device 1100 may differ from devices 100, 900, and 1000 in that the OLA/STFFT hardware 150 and OLA/iSTFFT hardware 160 may be directly included with the processing module 110. For example, a processing module 110 may be created or manufactured that may include separate hardware blocks for performing FFTs and iFFTs using a remote medium-speed memory 140 not located on the processing module 110. Additionally, while the remote medium-speed memory 140 in FIG. 11 is shown as being included in the device 1100, in other systems, the remote medium-speed memory 140 may be separate or distinct from the device 1100. Various other examples are possible.

The device 1100 may receive an input signal 105 and may pass any data or signal that the device 1100 desires to have converted to the remote medium-speed memory 140, which may be in communication with the OLA/STFFT hardware 150 or OLA/iSTFFT hardware 160 on the processing module 110. The remote medium-speed memory 140, OLA/STFFT hardware 150, and OLA/iSTFFT hardware 160 may convert data or signals in any of the manners discussed. The OLA/STFFT hardware 150 and OLA/iSTFFT hardware 160 may relay any signals or data back and forth from the remote medium-speed memory 140 as desired or requested by the device 1100 and in any manner discussed. The device 1100 may output an output signal 195 which may be a processed and/or converted signal or data, as discussed.

While device 1100 is shown as receiving an input signal 105, in other systems, the input signal 105 may be received from the input signal source 107 by the remote medium-speed memory 140 directly and/or through one or more different interfaces. Additionally or alternatively, while device 1100 is shown as sending an output signal 195, in other systems, the output signal 195 may be directly sent to the output signal destination 190 by the remote medium-speed memory 140. Other variations are possible.

In other variations, the slow memory 120 and remote medium-speed memory 140 may each or both be located in or separate from the devices 100, 900, 1000, and 1100, and/or may each or both be located in or separate from the processing module 110 or 1110. Other variations are possible.

In some systems, one or more devices, such as devices 100, 900, 1000, and 1100, one or more remote medium-speed memories 140, one or more OLA/STFFT hardwares 150, and/or one or more OLA/iSTFFT hardware 160 may be daisy-chained or run or operated in parallel and/or in communication with each other.

In some systems, multiple OLA/STFFT hardware components 150 or OLA/iSTFFT hardware components 160 may be included in one system. For example, a system may have two or more OLA/STFFT hardware components which may work together, each performing FFTs on portions of data to be used by the device. In some systems where multiple OLA/STFFT hardware components or OLA/iSTFFT hardware components are included, the multiple hardware components may be synchronized with each other, such as using one or more global or universal master control blocks 630 or another control device. In other systems, the control block 630 used with each hardware component may determine themselves which one may be the master and which other hardware components may be slave components. In some systems, it may be useful to use multiple hardware components 150 or 160 for accumulating data when an impulse response is partitioned, such as between early and late data. For example, this may be used for low latency convolution or partitioned overlap and save ("POLS") techniques. Other variations are possible.

Devices such as devices 100, 900, 1000, and 1100 may be implemented as or incorporated into various devices, such as an automotive head unit, an amplifier, a DSP or DSP chip, an FPGA, an integrated circuit, an audio amplifier, a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular example, a device 100, 900, 1000, or 1100 may be implemented using electronic devices that provide voice, audio, video or data communication.

Devices 100, 900, 1000, or 1100 may communicate with other devices, such as input signal sources 107 or output signal destinations 190, or with components such as the remote medium-speed memory 140 or domain conversion hardware, through one or more networks. The network may include wired networks, wireless networks, Ethernet AVB networks, or combinations thereof. The wireless network may be a cellular telephone network, an 802.11, 802.16, 802.20, 802.1Q or WiMax network. Further, the network may be a public network, such as the Internet, a private network, such as an intranet, or combinations thereof, and may utilize a variety of networking protocols now available or later developed including, but not limited to TCP/IP based networking protocols.

Signals and data may be transmitted or received over the network via a communication port or interface, and/or using a bus. The communication port or interface may be a part of the device or may be a separate component. The communication port may be created in software or may be a physical connection in hardware. The communication port may be configured to connect with a network, external media, the display, or any other components in system, or combinations thereof. The connection with the network may be a physical connection, such as a wired Ethernet connection or may be established wirelessly as discussed later. Likewise, the additional connections with other components of the system may be physical connections or may be established wirelessly. The network may alternatively be directly connected to the bus.

As noted, devices such as device 100, 900, 1000, or 1100, may include or access various types of memory, such as fast memory 118, slow memory 120, or remote medium-speed memory 140. Memory accessible to the device may be or include computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. Some further examples of memory accessible to the device may be an external storage device or database for storing data, a hard drive, compact disc ("CD"), digital video disc ("DVD"), memory card, memory stick, floppy disc, universal serial bus ("USB") memory device, or any other device operative to store data.

Memory accessible to a device such as device 100, 900, 1000, or 1100 may be operable to store instructions, code, logic, or algorithms executable by a processing chip or hardware. The functions, acts or tasks illustrated in the figures or described may be performed by a programmed processing chip or hardware executing the instructions stored in the memory. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The device 100, 900, 1000, or 1100 or memory of the device may include or access computer-readable media. The term "computer-readable medium" may include a single medium or multiple media, such as a centralized or distributed database, and/or associated caches and servers that store one or more sets of instructions. The term "computer-readable medium" may also include any medium that is capable of storing, encoding or carrying a set of instructions for execution by a processor or that cause a computer system to perform any one or more of the methods or operations disclosed. The "computer-readable medium" may be non-transitory, and may be tangible. In an example, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

The present system encompasses software, firmware, and hardware implementations. The system described may be implemented by software programs executable by a computer system. Further, implementations may include distributed processing, component/object distributed processing, and parallel processing. Alternatively, virtual computer system processing can be constructed to implement various parts of the system.

The system is not limited to operation with any particular standards and protocols. For example, standards for Internet and other packet switched network transmission (e.g., TCP/IP, UDP/IP, HTML, HTTP) may be used. Such standards are periodically superseded by faster or more efficient equivalents having essentially the same functions. Accordingly, replacement standards and protocols having the same or similar functions as those disclosed are considered equivalents thereof.

Devices such as device 100, 900, 1000, or 1100 may or may not include a display unit (not shown), such as a liquid crystal display (LCD), an organic light emitting diode (OLED), a flat panel display, a solid state display, a cathode ray tube (CRT), a projector, a printer or other now known or later developed display device for outputting determined information. The display may act as an interface for the user to see the functioning of the device 100, or specifically as an interface with software stored in memory.

Additionally or alternatively, devices such as device 100, 900, 1000, or 1100 may include an input device configured to allow a user to interact with any of the components of device or system. The input device may be a number pad, a keyboard, or a cursor control device, such as a mouse, or a joystick, touch screen display, remote control or any other device operative to interact with the device.

The term "module" may be defined to include a plurality of executable modules. As described herein, the modules are defined to include software, hardware or some combination thereof executable by computing module or hardware. Software modules may include instructions stored in memory, such as the fast memory 118, the slow memory 120, the remote medium-speed memory 140, or another memory device, that may be executable by a computing module or hardware. Hardware modules may include various devices, components, circuits, gates, circuit boards, and the like that may be executable, directed, and/or controlled for performance.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A device for processing a signal, comprising:
a processing module, including a first processor and an internal memory, configured to process first domain data;
a domain conversion hardware, separate from the processing module and including a second processor, configured to use the second processor to perform domain conversion without using the internal memory or the first processor of the processing module, the domain conversion hardware configured to convert second domain data into the first domain data; and
shared memory separate from and in communication with the processing module and the domain conversion hardware, the shared memory configured to receive the second domain data prior to conversion into the first domain data by the domain conversion hardware, the shared memory further configured to receive the converted first domain data from the domain conversion hardware prior to processing performed using the first processor of the processing module,
wherein the processing module is further configured to provide control data to the domain conversion hardware via the shared memory, the control data specifying parameters of transforms performed during operation of the domain conversion.

2. The device of claim 1, further comprising an inverse domain conversion hardware separate from the processing module and the shared memory, the inverse domain conversion hardware configured to convert processed first domain data into second domain output data.

3. The device of claim 2, where the shared memory is further configured to receive the processed first domain data from the processing module prior to conversion into the second domain output data by the inverse domain conversion hardware.

4. The device of claim 3, where the first domain data is frequency domain data and the second domain data is time domain data, and where the inverse domain conversion hardware comprises:
  an inverse Fast Fourier Transform component configured to perform an inverse Fast Fourier Transform on the processed first domain data to generate processed second domain data;
  a windowing component configured to apply a windowing function to the processed second domain data to obtain windowed data; and
  an overlap and add component configured to overlap and add the windowed data to generate second domain output data.

5. The device of claim 1, where the domain conversion hardware is configured to convert the second domain data into the first domain data by performing Fast Fourier Transforms on the second domain data in real time.

6. The device of claim 1, where the shared memory comprises static random-access memory.

7. The device of claim 1, where the processing module comprises a memory interface, and where the processing module communicates with the shared memory through the memory interface.

8. The device of claim 1, where the internal memory of the processing module comprises internal fast memory used for processing the first domain data, and where none of the internal fast memory is used for converting the second domain data into the first domain data.

9. The device of claim 1, where the processing module applies a first domain surround sound algorithm to the first domain data.

10. The device of claim 1, where the signal is an audio signal.

11. A method for processing a signal, the method comprising:
  receiving a signal in a first domain;
  storing input data about the signal in a shared memory separate from and accessible by a domain conversion hardware component and a processing module, the processing module including a first processor and an internal memory, the domain conversion hardware component including a second processor;
  converting the input data from the first domain to a second domain with the domain conversion hardware component operating to perform domain conversion of the input data, using the second processor but without using the internal memory or the first processor of the processing module operating in the second domain;
  providing control data from the processing module to the domain conversion hardware component via the shared memory, the control data specifying parameters of transforms performed during operation of the domain conversion;
  storing the converted input data in the shared memory; and
  processing the converted input data with the first processor of the processing module.

12. The method of claim 11, where the signal comprises a continuously received time domain signal;
  where the input data comprises samples from the signal; and
  where the conversion of the input data from the first domain to the second domain comprises a Fast Fourier Transform.

13. The method of claim 11, further comprising:
  storing the processed data in the shared memory; and
  converting the processed data from the second domain to the first domain with an inverse domain conversion hardware component.

14. The method of claim 13, further comprising outputting the converted processed data to an output destination device.

15. The method of claim 14, where the signal is a time domain audio signal, and where the output destination device is a speaker.

16. The method of claim 11, where the first domain is a time domain, and where the second domain is a frequency domain.

17. The method of claim 11, where the first domain is a frequency domain, and where the second domain is a time domain.

18. A method for processing a signal, the method comprising:
  processing data in a first domain with a first processor and an internal memory of a processing module;
  storing the processed data in a shared memory, the shared memory separate from and in communication with the processing module;
  providing control data from the processing module to a domain conversion hardware component via the shared memory, the control data specifying parameters of transforms performed during operation of domain conversion to be performed using the domain conversion hardware component, the domain conversion hardware component separate from the processing module and the shared memory and including a second processor; and
  converting the processed data from the first domain to a second domain with the second processor of the domain conversion hardware component operating to perform domain conversion of the processed data in accordance with the control data, without using the internal memory or the first processor of the processing module operating in the first domain.

19. The method of claim 18, where the data in the first domain comprises frequency domain signal samples; and
  where the conversion of the processed data from the first domain to the second domain comprises an inverse Fast Fourier Transform.

20. The method of claim 18, further comprising outputting the converted processed data to an output destination device.

21. The method of claim 20, where the output destination device is a speaker.

22. The method of claim 18, where the first domain is a time domain and where the second domain is a frequency domain.

23. The method of claim 18, where the first domain is a frequency domain and where the second domain is a time domain.

24. A system for processing a signal, comprising:
  a device comprising:
    a processing module including an internal memory and a first processor configured to process frequency domain data;
    a memory interface;
    a domain conversion hardware separate from the processing module and including a second processor configured to convert time domain data into the frequency domain data without using the internal memory or first processor of the processing module; and
    shared memory, separate from and in communication with the memory interface of the device and the domain conversion hardware, the shared memory configured to send the time domain data to the domain conversion hardware, the shared memory further configured to receive the converted frequency domain data from the domain conversion hardware prior to processing performed by the processing module, wherein the device is configured to provide control data from the processing module to the domain conversion hardware via the shared memory, the control data specifying parameters of transforms performed during operation of the domain conversion.

25. The system of claim 24, further comprising an inverse domain conversion hardware separate from the device and the shared memory, the inverse domain conversion hardware configured to convert processed frequency domain data into time domain output data.

26. The system of claim 25, where the shared memory is further configured to receive the processed frequency domain data from the device prior to conversion into the time domain output data by the inverse domain conversion hardware.

27. The system of claim 26, where the inverse domain conversion hardware comprises:

an inverse Fast Fourier Transform component configured to perform an inverse Fast Fourier Transform on the processed frequency domain data to generate processed time domain data;

a windowing component configured to apply a windowing function to the processed time domain data to obtain windowed data; and an overlap and add component configured to overlap and add the windowed data to generate time domain output data.

28. The system of claim 24, where the processing module is a processing chip.

29. The device of claim 1, wherein the transforms include Fast Fourier Transforms and the parameters include one or more of: an indication of an algorithm to use to perform the Fast Fourier Transforms, how often the Fast Fourier Transforms are to be performed, or a transform size indicating a sample size to use when performing the Fast Fourier Transforms.

* * * * *